(12) United States Patent
Yuan et al.

(10) Patent No.: US 7,492,900 B2
(45) Date of Patent: Feb. 17, 2009

(54) QUANTUM COMMUNICATION SYSTEM

(75) Inventors: Zhiliang Yuan, Cambridge (GB);
Andrew J. Shields, Cambridge (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 946 days.

(21) Appl. No.: 10/758,457

(22) Filed: Jan. 16, 2004

(65) Prior Publication Data
US 2004/0190725 A1    Sep. 30, 2004

(30) Foreign Application Priority Data
Jan. 16, 2003    (GB) .................................. 0301041.0

(51) Int. Cl.
*H04L 9/00*    (2006.01)
*H04L 9/12*    (2006.01)
(52) U.S. Cl. ..................................... 380/263
(58) Field of Classification Search .................. 380/263
See application file for complete search history.

(56) References Cited

U.S. PATENT DOCUMENTS 5,307,410 A * 4/1994 Bennett ....................... 380/256
5,757,912 A * 5/1998 Blow ........................... 380/256
5,764,765 A * 6/1998 Phoenix et al. ............. 380/283
5,768,378 A * 6/1998 Townsend et al. ........... 380/256
6,218,657 B1 * 4/2001 Bethune et al. .......... 250/214 R
2003/0169880 A1 * 9/2003 Nambu et al. ................ 380/256

FOREIGN PATENT DOCUMENTS

GB    2 368 502 A    5/2002
WO    WO 02/076016 A1    9/2002

* cited by examiner

*Primary Examiner*—Kambiz Zand
*Assistant Examiner*—William S Powers
(74) *Attorney, Agent, or Firm*—Oblon, Spivak, McClelland, Maier & Neustadt, P.C.

(57) ABSTRACT

A quantum communication system including (a) an emitter configured to emit a plurality of photon pulses in groups of photon pulses, each group of photon pulses emitted over a group time period, wherein the average number of photons per pulse is less than 1, and (b) a detector including a gating mechanism configured to switch the detector between an on state and an off state. The detector is in an on state for at least the duration of two photon pulses during the group time period.

33 Claims, 13 Drawing Sheets

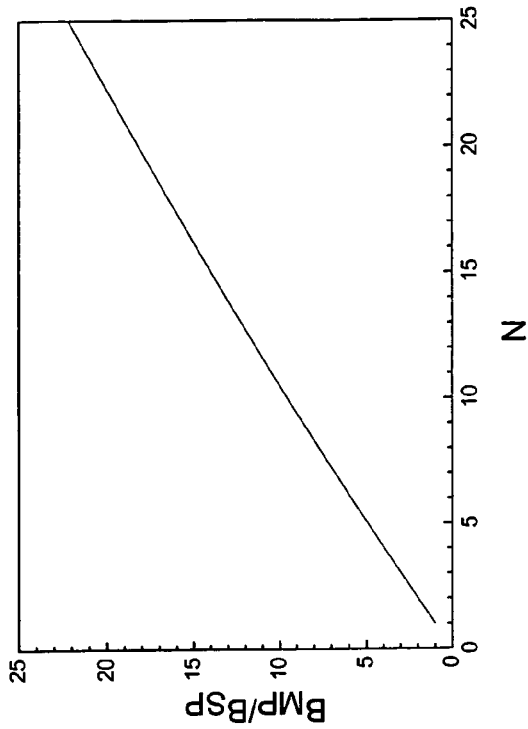
Fig. 13b
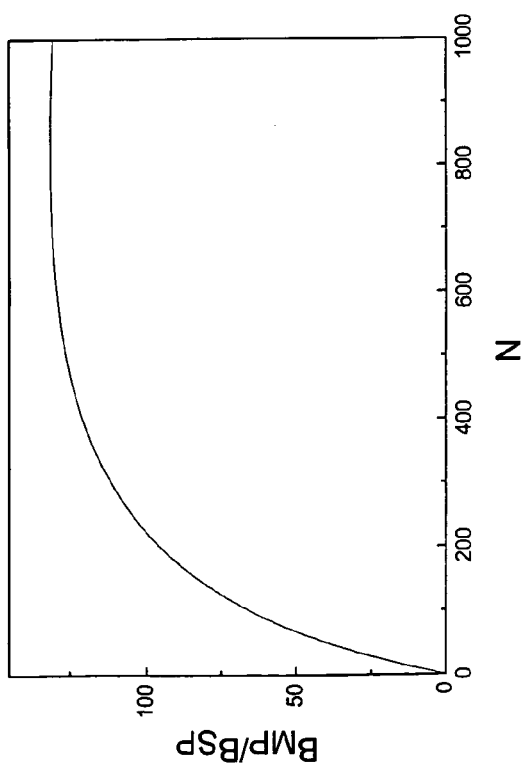
Fig. 13a
Figure 13

QUANTUM COMMUNICATION SYSTEM

FIELD OF THE INVENTION

The present invention relates to a quantum communication system which may be used for quantum key distribution between two parties. More specifically, the present invention relates to a quantum communication system which possesses a higher bit-rate than a conventional quantum communication system.

BACKGROUND TO THE INVENTION

In quantum communication systems, information is transmitted between a sender and a receiver by encoded single quanta, such as single photons. Each photon carries one bit of information encoded upon a property of the photon, e.g. polarisation, phase or energy/time of the photon. The photon may even carry more than one bit of information, for example, by using properties such as angular momentum.

An important application of quantum communications is for quantum key distribution which is a technique for forming a shared cryptographic key between two parties; a sender, often referred to as "Alice", and a receiver often referred to as "Bob". The attraction of this technique is that it provides a test of whether any part of the key can be known to an unauthorised eavesdropper (Eve). In many forms of quantum key distribution, Alice and Bob use two or more non-orthogonal bases in which to encode the bit values. The laws of quantum mechanics dictate that measurement of the photons by Eve without prior knowledge of the encoding basis causes an unavoidable change to the state of the photons. These changes to the states of the photon will causes errors in the bit values sent between Alice and Bob. By comparing a part of their communication, Alice and Bob can thus determine if Eve has gained information.

In order for such a system to operate correctly, it is important that each bit is encoded upon just one photon. This may be achieved using a single photon source, for which at most only one photon is generated within each photon pulse output. Alternatively, a weak pulsed laser may be used, in which case the laser pulses are attenuated to the level where the average number of photons per photon pulse is less than 1.

Both of these types of photon source are inefficient, i.e. some output pulses will not contain a photon and will thus not carry any information. In the case of a single photon source, the emitting material may be inefficient and sometimes not generate a photon at the desired time and/or the collection of the emitted photons into the following apparatus may be inefficient. Both of these effects will reduce the rate of useful photon pulses generated by the device. For the case of weak laser pulses, it is necessary to set the attenuator so that the average number of photons per output pulse is much less than 1, so as to reduce the rate of multiple photon pulses. This inefficiency of the photon source has an adverse effect upon the bit rate of the communication system.

The photons sent by Alice to Bob are encoded by an appropriate apparatus and sent to Bob over a communications medium such as a fibre optic cable or through free space. Photons will be lost in Alice's and Bob's apparatus due to inefficiency of its components, or while in transit from Alice to Bob over the communication medium. This loss further reduces the bit rate.

In order to maximise the bit rate, it is advantageous to increase the frequency of attempting to send photons from Alice to Bob. However, this is constrained by the maximum rate at which the single photon detector can be operated. In particular many types of single photon detector can register a false positive reading shortly after a correct positive reading has been registered. Avalanche photodiodes operated in Geiger mode for single photon detection are particularly prone to false positives being registered after a true reading has been registered.

In order to address this problem, the detector is gated so that the detector is only on for the time when a photon is expected and then switched off. The detector is switched off for long enough to ensure that it does not register a false positive reading when it is switched backed on. This requirement further decreases the possible bit rate of the communication system.

SUMMARY OF THE INVENTION

An object of the present invention is to address the above problems and provide a communication system which can achieve a higher bit rate than conventional quantum communication systems.

Thus, in a first aspect, the present invention provides a quantum communication system comprising:
an emitter configured to emit a plurality of photon pulses in groups of photon pulses, each group of photon pulses being emitted over a group time period, each photon pulse having a probability of containing at most one photon; and
a detector comprising gating means configured to switch the detector between an on state and an off state,
wherein the detector is in an on state for at least the duration of two photon pulses during said group time period.

Fibre based quantum cryptography systems, often use 1.3 µm or 1.55 µm photons for key transmission due to the relatively low fibre attenuation at those wavelengths. InGaAs avalanche photodiodes (APDs) are often used for single photon detection at these wavelengths.

Avalanche photodiodes sometimes produce a response when there is no photon incident upon the device, called a dark count. To minimise the dark count rate, the InGaAs APD can be operated in gated mode, for which the bias of the APD is raised to a value $V_{det2}$ above its breakdown voltage, thus activating single photon detection, for only the short time period when the signal pulse arrives. The detector time gate $d_{det}$ will typically be a few nanoseconds wide. In between detection gates, the APD voltage is held at a value $V_{det1}$ below the breakdown threshold and is thus not sensitive to light. The quantum cryptography system is well suited to gated operation mode, as the arrival time of each signal pulse is well defined.

In a conventional system, the detector is kept on for the time when a photon pulse is expected, the detector is then put in an 'off state' to allow the charge to disperse. The system is configured so that the next photon pulse does not arrive at the detector until the detector has been switched off for long enough so that there is little or no chance of the detector registering a spurious or "afterpulse" signal.

In the present invention, photon pulses are sent in groups of multiple pulses, the separation between the pulses in a group of pulses is less than the time when the detector may register an afterpulse signal or false positive reading. However, because the probability of detecting a photon in any photon pulses is very low, the rate of afterpulses is still low.

The detector may be kept in an 'on-state' for the whole group time period, in other words it may be kept on for the whole time when the group of pulses are expected to arrive at the detector or it may be repetitively switched on for just the time when pulses are expected to arrive at the detector.

Preferably, the detector comprises means to ignore any second or subsequent signals received by the detector in a given group time period after a first signal has been detected. Thus, any afterpulse signals which arise after the first photon from a group of photon pulses has been detected can be ignored.

In order for Alice and Bob to compare measurements, they need to synchronise their apparatus, this may be done by communicating a clock signal between the sender and the receiver.

A clock pulse may be sent from the sender to the receiver with each group of photons. Alternatively, the clock signal may be sent so that it arrives at the detector at a different time to that of the group of photons.

The clock signal may have a different wavelength to that of the photon pulses and may be multiplexed and sent along the same fibre. Alternatively, or additionally, the clock signal may have a different polarisation to that of the photon pulses. The clock pulse may also be delayed relative to the photon pulses, so that it can be detected in the receiving apparatus at a different time. Alternatively a timing reference may be used as the clock.

The detector is preferably an avalanche photodiode detector.

In a typical quantum communication system, the photons which are sent to the receiver are encoded. Preferably, each photon pulse in a group of photon pulses is encoded independently of the other pulses in the group of photon pulses. Thus, if an eavesdropper intercepts a photon pulse containing one photon she does not gain any information about photons which may be contained within other pulses of the same group of pulses.

The photon pulses may be encoded using phase, polarisation, energy/time etc.

If the phase of the photons in an interferometer is used to encode the information, the system may comprise a first interferometer having a long arm and a short arm, one of said arms having a phase variation means which allows the phase of the photon passing through that arm to be set between one of at least two values. Preferably, the system further comprises a second interferometer having a long arm and a short arm, one of said arms having a phase variation means which allows the phase of the photon passing through that arm to be set to one of at least two values.

The at least two phase settings preferably occupy orthogonal bases, for example one setting may be 0° while the other is 90°. In this case, a key may be distributed using the B92 protocol as explained in GB 2368502.

The phase variation means may be able to set the phase of a photon to one of four settings. Preferably, two of the four settings will occupy the same first basis whereas the other two settings will occupy a second basis, the first basis being orthogonal to the second basis. For example, the four settings may be 0°, 90°, 180° and 270°. In this case, a key may be distributed using the BB84 protocol as explained in GB 2368502.

Five or more settings may be used to allow encoding using intermediate basis as explained in GB 2368502.

Only photon pulses which pass through the short arm of one interferometer and the long arm of the other are of use in distributing the key or other information between Alice and Bob. Thus, preferably, the detector is configured to ignore signals from photon pulses which pass through the long arms of both interferometers or the short arms of both interferometers.

The detector may be further configured to detect only those photons which pass the long arm of one interferometer and the short arm of the other. Thus, the detector may be gated in an on state only during the arrival time of photon pulses which pass the long arm of one interferometer and the short arm of the other interferometer.

Alternatively, the system may further comprise directing means configured to ensure that photons which have passed through the short arm of the first interferometer are directed down the long arm of the second interferometer and photons which have passed through the long arm of the first interferometer pass through the short arm of the second interferometer.

Such directing means may comprise first polarising means configured to allow photons which have travelled through different arms of the first interferometer different polarisations and second polarising means which distinguish between the photons having different polarisations and direct them down the appropriate arm of the second interferometer.

In the present invention, groups of photon pulses are used to distribute the key. These photon pulses can be emitted at a very quick rate which may exceed the rate at which the phase varying means may be altered. To circumvent this problem, a passive phase encoding system may be used which comprises a first interferometer comprising a long arm and a short arm; and a second interferometer comprising a long arm and a short arm, the first and second interferometers being configured such that a photon passing through the first interferometer experiences a different change in its phase to a photon travelling through the second interferometer, the phase encoding means further comprising first switching means to direct a photon into either the first interferometer or the second interferometer.

The switching means allows a photon to be directed into either the first or the second interferometer and hence allows the phase of the photon to be set to one of two settings. The switch which directs the photon pulses into one of the two interferometers may have a higher operation rate than that of the previously mentioned phase varying means.

The switching means may be provided by a passive component such as a fibre coupler or it may be an active component which is controlled by a random number generator or the like.

The system may also further comprise a third interferometer comprising a long arm and a short arm and a fourth interferometer comprising a long arm and a short arm, the third and fourth interferometers being configured such that a photon passing through the third interferometer experiences a different change in its phase to a photon travelling through the fourth interferometer, the system further comprising means to direct a photon into either the third interferometer or the fourth interferometer.

The means to direct a photon into either of the third or fourth interferometers is preferably a passive component and may be provided by a fibre coupler.

Passive encoding may be used to switch the phase between more than 2 settings by adding further interferometers which are configured to cause other phase changes.

To optimise interference, it is desirable to ensure that photon pulses which take the short arm of the first interferometer and the long arm of the second interferometer take the same time to pass through both interferometers as photon pulses which pass through the long arm of the first interferometer and the short arm of the second interferometer, this may be achieved by providing means to vary or tune the path length of at least one of the interferometers.

A system which automatically balances the two possible path lengths has a first station comprising interferometer having a long arm and a short arm, one of said arms having random phase variation means which allows the phase of a photon passing through that arm to be randomly offset by one of at least two values, a second station comprising means to apply a random phase variation which allows a photon pulse passing therethrough to have its phase randomly offset by one of at least two values and reflecting means to reflect the pulse back through the first interferometer.

The detector of the above system maybe configured to ignore photon pulses which have passed through either the long arm of the interferometer twice or the short arm of the interferometer twice.

Alternatively, the system may comprise directing means configured to ensure that photons which have passed through the short arm of the first interferometer are reflected back through the long arm of the first interferometer and photons which have passed through the long arm of the first interferometer are reflected back through the short arm of the first interferometer.

These directing means may be provided by first polarising means configured to allow photons which have travelled through different arms of the interferometer to have different polarisations and second polarising means which distinguish between the photons having different polarisations and direct them down the appropriate arm of the first interferometer.

As previously mentioned, there are a plurality of pulses in each group period, preferably there are from 2 to 1000 photon pulses in each group period.

A system according to any preceding claim, wherein there is a separation from 100 ns to 10 µs between the final photon pulse of any group and the first photon pulse of the following group. It is necessary for there to be enough time between group periods to avoid any afterpulse signal arising from one group affecting detector readings in the next group period.

Preferably, the separation between photon pulses is from 0.5 to 5 ns.

The probability of a photon being present in a photon pulse is preferably less than 0.2.

The emitter is configured to output a plurality of pulses, this may be achieved by providing a laser diode which outputs a plurality of pulses in response to a single clock signal. In a preferred embodiment, the emitter comprises a photon source, means to subdivide the output of said source into a plurality of optical fibres having differing lengths and combiner means to combine said plurality of fibres such that a plurality of pulses spaced apart in time are outputted from said combiner means.

The means to subdivide the output of the photon source may be provided by a 1×N fibre coupler. The means to combine the plurality of fibres may be provided by an N×1 fibre coupler.

In a second aspect, the present invention provides a method of quantum communication comprising:
  emitting a plurality of photon pulses in groups of photon pulses from an emitter, each group of photon pulses emitted over a group time period, each photon pulse having a probability of containing at most one photon;
  detecting the emitted pulses, wherein the detector is in an on state for at least the duration of two photon pulses during said group time period during detection.

The information distributed using the above system may be encoded using one of the conventional protocols such as BB84, B92 etc. In order to implement these protocols, it is necessary for the parties to know the phase, polarisation etc basis which they used to encode each photon pulse. The sender needs to determine to which one of the plurality of photon pulses of each group each detected photon corresponds. This information can be retrieved using its time delay relative to the clock pulse.

In a third aspect, the present invention provides a method of operating a detector in quantum communication system, wherein a plurality of photon pulses are sent to the detector in groups of photon pulses from an emitter, each group of photon pulses emitted over a group time period, each photon pulse having a probability of containing at most one photon, the method comprising:
  detecting the emitted pulses, by placing the detector in an on state for at least the duration of two photon pulses over said group time period during detection.

BRIEF DESCRIPTION OF THE DRAWINGS

The present invention will now be described with reference to the following examples and preferred non-limiting embodiments in which:

FIGS. 2(a) to 2(e) are a sequence of plots against time schematically illustrating how Alice should time her pulses and how Bob should gate the detector in the system of FIG. 1a;

FIGS. 13a and b are plots of the ratio of the bit rates as a function of the number of pulses in a group period, for a single pulse clock period.

DESCRIPTION OF THE PREFERRED EMBODIMENTS

Figure 1:
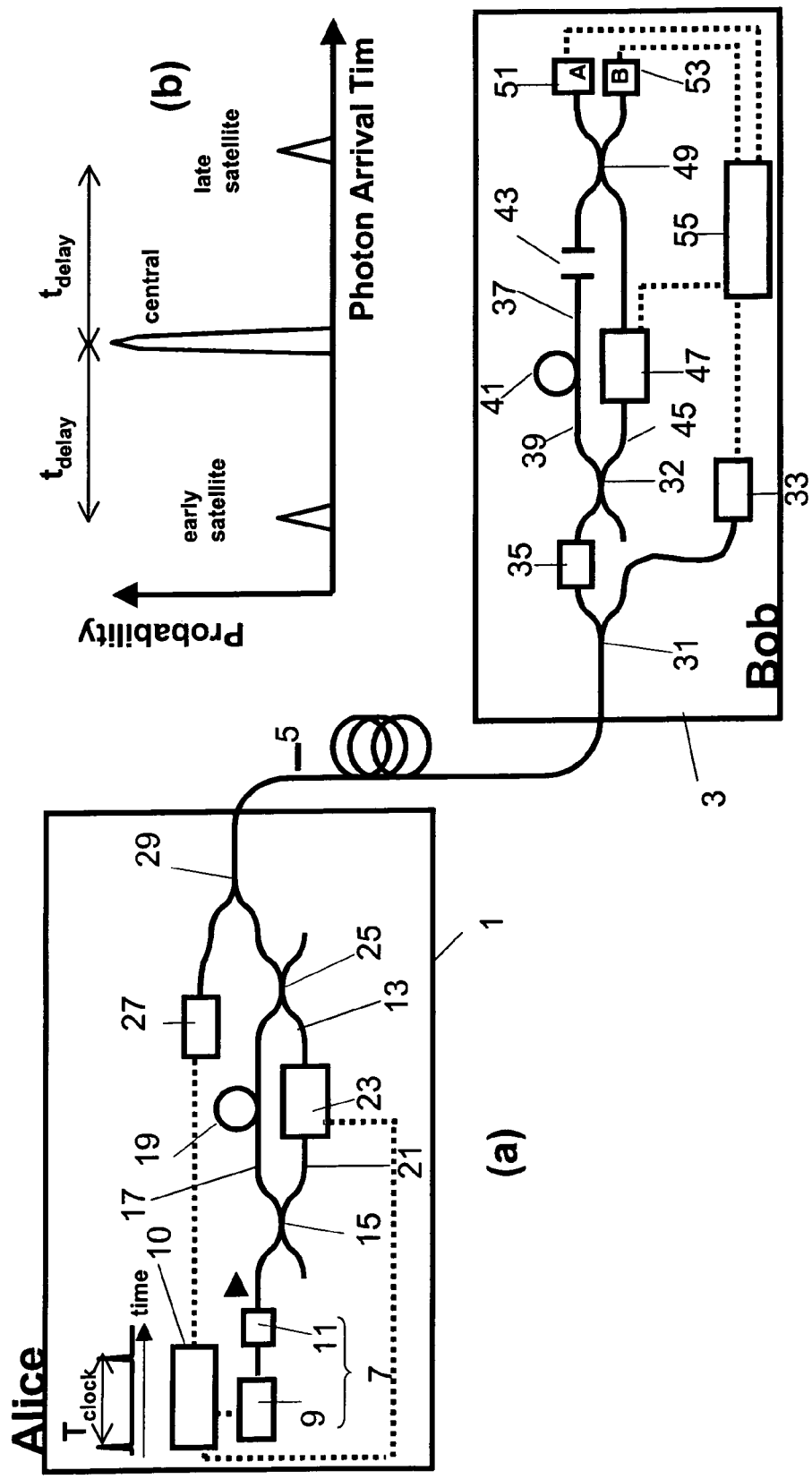
FIG. 1a is a schematic of a prior art quantum communication system useful for understanding the present invention.
FIG. 1b is a plot of the probability of a photon arriving at the detector against time.

FIG. 1(a) shows a prior art apparatus for quantum key distribution between two parties: Alice 1; and Bob 3, connected by an optical fibre 5.

Alice generates single photons, which she encodes and sends to Bob, along with a bright laser pulse to act as a clock signal.

Alice's equipment comprises a single photon source 7. The single photon source is made from a pulsed laser diode 9 and an attenuator 11. The laser produces a single optical pulse for each clock signal with a repetition period of $T_{clock}$. Typically each laser pulse has a duration of $d_{laser}$=100 ps. The level of attenuation is set so that the average number of photons per pulse which are sent by Alice are much less than 1 ($\mu<<1$), for example $\mu$=0.1 is typical.

A clock signal is provided to the laser 9 by bias electronics 10. The bias electronics may comprise a timing unit, a driver for the signal laser 9, a driver for the clock laser 27 which will be described later and a driver for the phase modulator 23 which will be later described.

The photon pulses from the single photon source 7 are then fed into an imbalanced Mach-Zender interferometer 13. The interferometer 13 consists of an entrance fibre coupler 15, a long Arm 17 with a delay loop of fibre 19 designed to cause an optical delay, a short arm 21 with a phase modulator 23, and an exit fibre coupler 25 which combines the fibres 17 and 21 from the long and short arms respectively. The length difference of long and short arms corresponds to an optical propagation delay of $t_{delay}$. Typically the length of the delay loop 19 is chosen to produce a delay $t_{delay}$~5 ns. A photon travelling through the long arm will lag that travelling through the short arm 21 by a time of $t_{delay}$ at the exit of the interferometer 13.

The output of Alice's interferometer 13 is multiplexed with the output from a bright clock laser 27 at a wavelength division multiplexing (WDM) coupler 29. The clock laser 27 operates under the control of the biasing circuit 10. The clock laser 27 may emit at a different wavelength from that of the signal laser 9, so as to facilitate their easy separation at Bob's 3 end. For example the signal laser 9 may operate at 1.3 µm and the clock laser 27 at 1.55 µm or vice versa.

The multiplexed signal and clock pulses are transmitted to the recipient Bob 3 along optical fibre link 5.

Bob's equipment 3 is similar to Alice's equipment 1.

Bob's equipment 3 comprises a WDM coupler 31 which is used to de-multiplex the signal received from Alice 1 into a signal from Alice's bright clock laser 27 and the pulses from Alice's signal laser 9.

The bright clock laser 27 signal is routed to an optical receiver 33 to recover the clock signal for Bob to synchronise with Alice. The optical receiver 33 transfers this signal to biasing circuit 55. Biasing circuit 55 synchronises various parts of Bob's equipment 3.

The signal pulses are fed into a polarisation controller 35 to restore their original polarisation.

The signal pulses then pass Bob's interferometer 37. Bob's interferometer 37 is similar to Alice's interferometer and has a long Arm 39 which comprises an optical fibre delay loop 41 and a variable fibre delay line 43. The short arm 45 of the interferometer 39 comprises a phase modulator 47. Phase modulator 47 is controlled by biasing circuit 55 in accordance with the signal received from clock laser 27, this will be described in more detail with reference to FIG. 2.

The long arm 39 and the short arm 45 of the interferometer are connected to a 50/50 fibre coupler 49 with a single photon detector 51 and 53 attached to each output arm of the fibre coupler 49. The single photon detector 51 attached to one arm of the coupler 49 will be referred to as detector A and the single photon detector 53 attached to the other arm of the output coupler 49 will be referred to as detector B. Photon detectors 51 and 53 are controlled by biasing circuit 55 in accordance with the signal received from clock laser 27, this will be described in more detail with reference to FIG. 2.

The variable delay line 43 at Bob's interferometer is adjusted to make the optical delay between its two arms 39 and 45 identical as that between the arms of Alice's interferometer 13, $t_{delay}$.

There are four possible paths for a signal pulse travelling from Alice's signal laser 9 to Bob's single photon detectors 51 and 53:

i) Alice's Long Arm 17—Bob's Long Arm 39 (Long-Long);
ii) Alice's Short Arm 21—Bob's Long Arm 39 (Short-Long);
iii) Alice's Long Arm 19—Bob's Short Arm 45 (Long-Short); and
iv) Alice's Short Arm 21—Bob's short arm 45 (Short-Short).

Bob's interferometer 37 is balanced by adjusting the variable delay 43 so that photons taking paths (ii) and (iii) arrive at nearly the same time, at the exit coupler 49 of Bob's interferometer 37. Nearly the same time means within the signal laser coherence time which is typically a few picoseconds for a semiconductor distributed feed back (DFB) laser diode.

FIG. 1b schematically illustrates the probability of a photon arriving at the coupler 49 against time. Photons taking paths (ii) and (iii) corresponds to the central peak in FIG. 1b. Photons taking path (i) have a positive delay $t_{delay}$ (later arrival time), and those taking path (iv) have a negative delay $t_{delay}$ (early arrival time) compared to paths (ii) and (iii).

Only photons arriving in the central peak shown in FIG. 1b undergo interference. Thus only these photons are of interest.

Bob gates his detectors 51, 53 to record only photons in the central peak and not those in the earlier or later satellite peak.

To maximise the interference fringe visibility, the signal pulses at the two input arms of the exit coupler 49 of Bob's interferometer 37 must be controlled to have same linear polarisation. This can be achieved by using a polarisation controller on each of the inputs of the exit coupler 49 (not shown).

By controlling the voltages applied to their phase modulators 23, 47, Alice and Bob determine in tandem whether paths (ii) and (iii) undergo constructive or destructive interference at detectors A and B, 51, 53.

The variable delay 43 can be set such that there is constructive interference at detector A 51 (and thus destructive interference at detector B 53) for zero phase difference between Alice and Bob's phase modulators. Thus for zero phase difference between Alice's and Bob's modulators and for a perfect interferometer with 100% visibility, there will be a negligible count rate at detector B 53 and a finite count rate at A 51.

If, on the other hand, the phase difference between Alice and Bob's modulators is 180°, there should be destructive interference at detector A 51 (and thus negligible count rate) and constructive at detector B 53. For any other phase difference between their two modulators, there will be a finite probability that a photon may output at detector A 51 or detector B.

In the four-state protocol, which is sometimes referred to as BB84, Alice sets the voltage on her phase modulator to one of four different values, corresponding to phase shifts of 0°, 90°, 180°, and 270°. Phase 0° and 180° are associated with bits 0 and 1 in a first encoding basis, while 90° and 270° are associated with 0 and 1 in a second encoding basis. The second encoding basis is chosen to be non-orthogonal to the first.

The phase shift is chosen at random for each signal pulse and Alice records the phase shift applied for each clock cycle.

Meanwhile Bob randomly varies the voltage applied to his phase modulator between two values corresponding to 0° and 90°. This amounts to selecting between the first and second measurement bases, respectively. Bob records the phase shift applied and the measurement result (i.e photon at detector A 51, photon at detector B 53, photon at detector A 51 and detector B 53, or no photon detected) for each clock cycle.

In the BB84 protocol, Alice and Bob can form a shared key by communicating on a classical channel after Bob's measurements have taken place. Bob tells Alice in which clock cycles he measured a photon and which measurement basis he used, but not the result of the measurement. Alice then tells Bob the clock cycles in which she used the same encoding basis and they agree to keep only those results, as in this case Bob will have made deterministic measurements upon the encoded photons. This is followed by error correction, to remove any errors in their shared key, and privacy amplification to exclude any information known to an eavesdropper.

Figure 2:
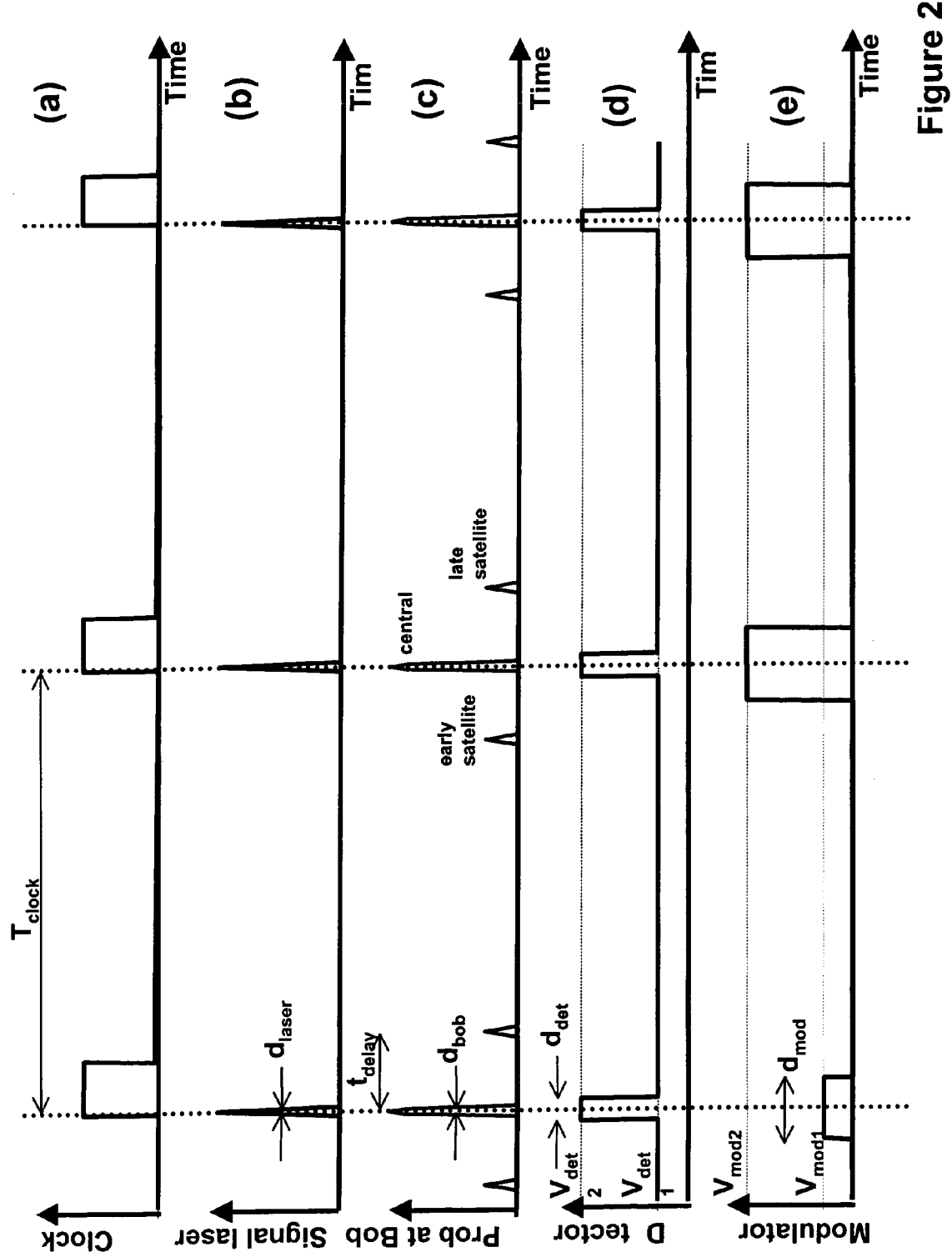

FIG. 2 shows plots of the timing schemes which may be used for the prior art quantum cryptographic system of FIG. 1a.

FIG. 2a shows the clock signal produced by the clock laser 27 as a function of time. The clock has a repetition period $T_{clock}$. The rising edge of the clock signal is used to synchronise Alice's signal laser 9, Alice's phase modulator 23, Bob's phase modulator 47 and Bob's detectors 51 and 53.

The output of the signal laser 9 is shown in FIG. 2b. For each clock period, the signal laser 9 is triggered to produce one pulse of width $d_{laser}$.

FIG. 2c plots the probability of a photon arriving at Bob's detectors 51 and 53 (i.e. sum of the probabilities of a photon arriving at detector A or detector B) as a function of time. Each signal pulse now has a width of $d_{bob}$, which may be greater than $d_{laser}$ due to dispersion in the fibre. Three arrival windows can be seen for each clock cycle. In order of arrival time, these correspond to photons taking the short-short, long-short or short-long and long-long paths through Alice's-Bob's interferometer as described with reference to FIG. 1b. Thus the first and second, as well as the second and third pulses are separated by a time delay $t_{delay}$.

Only photons arriving in the central window of each clock cycle undergo interference and are thus of interest. The single photon detectors are gated to be on only when the central pulse arrives in each clock cycle, as shown in FIG. 2d. This is achieved by biasing the detector with a voltage $V_{det2}$ for which it is in an active state for a short duration $d_{det}$ during each clock cycle when the central pulse arrives. The bias voltage duration $d_{det}$ is typically chosen to be longer than $d_{bob}$ and is typically a few nanoseconds. At other times the detector is held at a voltage $V_{det1}$ for which it is inactive.

For a single photon detector based upon an avalanche photodiode, time gating can be achieved by choosing $V_{det2}$ to be greater than the avalanche breakdown voltage of the diode and $V_{det1}$ to be less than the breakdown voltage. An avalanche can only be triggered when the diode bias exceeds the breakdown threshold.

The avalanche process generates a large number of charge carriers within the diode forming an easily detectable current. Some of these carriers may be localised at hetero-junctions or at trap states within the semiconductor. Carriers confined in such traps can have a lifetime of several microseconds. If the diode is biased above the avalanche breakdown threshold, before the trapped carriers have decayed, there is a possibility that a trapped carrier could be released and then trigger another avalanche. The resultant spurious signal is called an 'afterpulse'.

To minimising the rate of afterpulse counts, the APD has to be biased inactive for a sufficiently long time to allow most of the trapped charge to decay. Thus in a conventional quantum cryptography system, afterpulsing limits the minimum period between APD detection gates and thus the minimum clock period $t_{clock}$. Typically $t_{clock} \sim 1$ μs.

Alice's and Bob's phase modulators 23 and 47 are driven by separate voltage pulse generators. The voltage pulse generators are also synchronised with the clock signal (of FIG. 2a), as shown in FIG. 2e.

During the pass of each signal pulse through the phase modulator, the pulse generator outputs one of a number of voltage levels, $V_{mod1}$, $V_{mod2}$ etc. For the BB84 protocol, for instance, Alice applied one of four different voltage levels, corresponding to phase shifts of 0°, 90°, 180°, and 270°. Meanwhile Bob applies two voltage levels to his modulator corresponding to phase shifts of 0° and 90°. Alice and Bob vary the applied phase shifts for each signal pulse randomly and independently of one-another.

Figure 3:
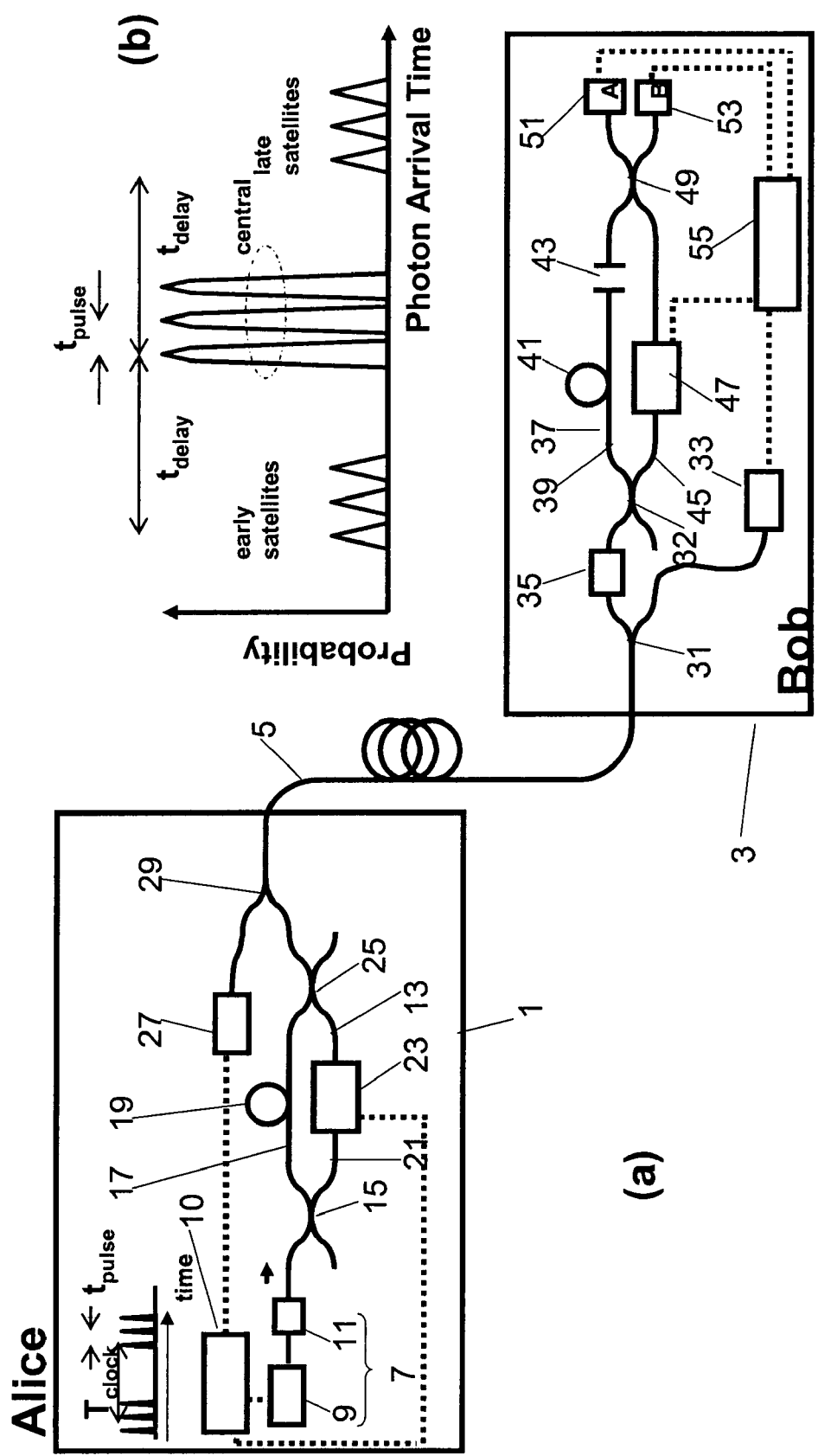
FIG. 3(a) is a communication system in accordance with an embodiment of the present invention and FIG. 3(b) is a schematic plot of the probability of a photon being present in a pulse received by a detector against arrival time at the detector.

FIG. 3a shows an apparatus for multiple pulse quantum cryptography. Alice generates single photons, which she encodes and sends to Bob, along with a bright laser pulse to act as a clock signal.

Alice and Bob's equipment is similar to that described with reference to FIG. 1a. Therefore, to avoid unnecessary repetition, like reference numerals will be used to denote like features.

Although in FIG. 3a, photon pulses are provided by a signal laser 9 which is passed through attenuator 11, the photon pulses may also be generated by a single photon source.

The system of FIG. 3a is configured differently to that explained with reference to FIG. 1 in respect of the timing operations governed by the biasing electronics 10.

The biasing electronics 10 are configured to instruct signal laser 9 to generate more than one pulse during every clock cycle. For example the signal laser could generate a number (N) of pulses of width $d_{laser}$ of equal intensity separated by a delay of $t_{pulse}$.

The separation between pulses $t_{pulse}$ is much less than the clock period $T_{clock}$, while it should be greater than the duration of the signal pulses, $d_{laser}$. The clock period may be in the range 100 ns-10 μs and may typically be $T_{clock}$=1 μs. Thus the pulse separation may be in the range of 0.5-5 ns and will typically be $t_{pulse}$=2 ns. The number of pulses may be in the range 2-1000 and may for example be N=10.

Each of the pulses generated by the laser are strongly attenuated so that the average number of photons in each pulse leaving Alice μ<<1. Typically μ=0.1. In comparison to single pulse quantum cryptography, the number of photons per clock cycle is enhanced in multi-pulse quantum cryptography by a factor of N.

The attenuated signal pulses are then fed into Alice's imbalanced Mach-Zender interferometer 13 through fibre optical coupler 15. As described with reference to FIG. 1, the interferometer 13 has a long arm 17 with an optical fibre delay loop 19 and a short arm 21 with a fibre optic phase modulator 23.

The length difference of the two arms corresponds to an optical propagation delay of $t_{delay}$. Typically the length of the delay loop may be chosen to produce a delay $t_{delay}$~25 ns. A photon travelling through the long arm 17 will lag that travelling through the short arm 21 by a time of $t_{delay}$ at the exit of the interferometer 13. The two arms 17, 21 are combined together with a fibre optic coupler 25.

Alice applies a phase delay during the propagation of each signal pulse which is chosen at random from a fixed number of values. For the four-state protocol BB84 for example, the phase delay is either 0°, 90°, 180° or 270°. Note that the N pulses within one clock cycle are modulated independently and not with the same value. Alice records the phase modulator 23 setting for each signal pulse within each clock cycle.

As described with reference to FIG. 1*a*, the output of Alice's interferometer is multiplexed with the bright clock laser 27 at the WDM coupler 29. The clock laser 27 may emit at a different wavelength from that of the signal laser 9, so as to facilitate their easy separation at Bob's end. For example the signal laser may operate at 1.3 µm and the clock laser at 1.55 µm or vice versa.

The clock may also be delivered in other ways. For example Alice may multiplex the signal pulses with a bright clock laser pulse at the same or different wavelength which is delayed relative to the start of the clock cycle and which does not coincide with the signal pulses. The bright clock pulse may also be prepared in an orthogonal polarisation state to the signal pulses. Alternatively the clock signal may be sent on a separate optical fibre. Alternatively, synchronisation may be achieved by using a timing reference.

Bob's equipment is similar to that described with reference to FIG. 1*a* and to avoid unnecessary repetition, like reference numerals will be used to denote like features.

Bob first de-multiplexes the transmitted signal using the WDM coupler 31. The bright clock laser 27 signal is routed to an optical receiver 33 to recover the clock signal for Bob to synchronise with Alice.

If Alice delivers the clock using an alternative method, Bob will recover the clock accordingly. If Alice sends the clock signal as a single bright pulse within each clock cycle which is delayed relative to signal pulses then Bob may use an imbalanced coupler, such as 90/10, to extract a fraction of the combined signal which is measured with a photo-diode. A clock pulse is then recovered if the incident intensity is above an appropriately set threshold. The efficiency of this scheme may be improved if Alice sends the clock in an orthogonal polarisation state to the signal pulses. Bob then uses a polarisation controller and a polarising beamsplitter to separate the signal and clock pulses. Alternatively Bob may detect the clock on a separate fibre or using a timing reference.

The signal pulses are fed into a polarisation controller 35 to restore their original polarisation.

The signal pulses then pass through Bob's interferometer 37. The long arm 39 of Bob's interferometer 37 contains an optical fibre delay loop 41 and a variable fibre delay line 43, and the short arm 45 contains a phase modulator 47. The two arms 39, 45 are connected to a 50/50 fibre coupler 49 with single photon detectors 51, 53 attached to each output arm.

The variable delay line 43 of Bob's interferometer is adjusted to make the optical delay between its two arms 39, 45 similar to that between the arms 17, 21 of Alice's interferometer 13, $t_{delay}$.

The variable fiber delay line 43 can either be an airgap, or a fibre stretcher, driven by a piezo-electric actuator. Alternatively, the two delays can be balanced by carefully controlling the length of fibre in Alice's and Bob's interferometers 13 and 37 respectively.

Fine adjustment of the length of the two optical paths can be achieved through the calibration of zero phase delay in the two modulators.

Bob applies a phase delay using his phase modulator 47 during the propagation of each signal pulse which is chosen at random from a fixed number of values. For the four-state protocol BB84, for example, the phase delay is either 0° or 90°. Bob chooses the phase delay for each signal pulse randomly and independently of Alice. The N pulses sent by Alice within one clock cycle are modulated independently and not with the same value. Bob notes the phase modulator setting for each signal pulse within each clock cycle, as well as the result of the measurement: photon at detector A, photon at detector B, no photon detected, or photon detected at both A and B.

There are four possible paths for each signal pulse travelling from Alice's signal laser to Bob's single photon detectors:

i) Alice's Long Arm—Bob's Long Arm (Long-Long);
ii) Alice's Short Arm—Bob's Long Arm (Short-Long);
iii) Alice's Long Arm—Bob's Short Arm (Long-Short); and
iv) Alice's Short Arm—Bob's short arm (Short-Short).

The interferometer is balanced so that photons taking paths (ii) and (iii) arrive at nearly the same time, within the signal laser coherence time which is typically a few picoseconds for a semiconductor distributed feed back (DFB) laser diode, at the exit coupler of Bob's interferometer. Photons taking path (i) have a positive delay $t_{delay}$, and those taking path (iv) have a negative delay $t_{delay}$ compared to paths (ii) and (iii).

Since there are N pulses for each clock cycle, there are now 3 N different time windows during which a signal pulse may arrive at either of the detectors 51 and 53, as shown in FIG. 3*b*. Only the photons arriving during the central N time windows will undergo interference of paths (ii) and (iii). Thus only these photons are of interest and Bob gates his detectors 51, 53 to record only during these central N time windows.

The delay between signal pulses $t_{pulse}$ is chosen to be longer than the response time of the single photon detector, so that Bob can distinguish the different signal pulses. For an InGaAs APD, for example, the response time is typically ~200 ps. The delay between signal pulses $t_{pulse}$ also has to be long enough so that each individual signal pulse can be modulated independently by the phase modulators. Typically $t_{pulse}$ may be in the range 200-5 ns. Typically $t_{pulse}=2$ ns is a convenient value.

The length of the delay loop is carefully selected so that the central arrival window of any signal pulse will not temporally overlap with a satellite arrival time window of any other signal pulse. This can be achieved if $t_{delay}$>N $t_{pulse}$ where N is the number of signal pulses within each clock period. Thus if N=10 and $t_{pulse}=2$ ns, the length of the delay loops should be chosen such that $t_{delay}$>20 ns.

Alternatively, the central time windows can be interlaced with satellite time windows, so that the satellite time windows do not coincide with the central time windows. For example, considering two consecutive signal pulses, the late satellite of the first signal pulse may coincide with the early satellite of the second signal pulse. This can be achieved if $t_{pulse}=2\,t_{delay}$. The delay between pulses should be greater than the APD's time resolution, typically 200 ps. It is convenient to choose $t_{delay}=1$ ns, and accordingly $t_{pulse}=2$ ns.

By controlling the voltages applied to their phase modulators, Alice and Bob determine in tandem whether paths (ii) and (iii) undergo constructive or destructive interference at each detector. The variable delay can be set, or the phase modulators calibrated, such that there is constructive interference at detector A 51 (and thus destructive interference at detector B 53) for zero phase difference between Alice and Bob's phase modulators. For the protocol described below, Bob will associate a count in detector A 51 with bit=0 and a count in detector B 53 with bit=1. In this case and for a perfect interferometer with 100% visibility, there will be negligible count rate at detector B 53 and a finite count rate at detector A. If, on the other hand, the phase difference between Alice and Bob's modulators is 180°, we expect destructive interference at detector A 51 (and thus negligible count rate) and constructive at detector B 53. For any other phase difference between their two modulators, there will be a finite probability that a photon may output at detector A 51 or B 53.

In the four-state protocol, which is sometimes referred to as BB84, Alice sets the voltage on her phase modulator 23 to one of four different values, corresponding to phase delays of 0°, 90°, 180°, and 270°. Phase 0° and 180° are associated with bits 0 and 1 in a first encoding basis, while 90° and 270° are associated with 0 and 1 in a second encoding basis. The second encoding basis is chosen to be non-orthogonal to the first. The phase shift is chosen at random for each signal pulse. The N pulses of one clock cycle are modulated independently by Alice and not with the same value. Alice notes the phase modulator 23 setting for each signal pulse within each clock cycle.

Meanwhile Bob randomly varies the voltage applied to his phase modulator 47 between two values corresponding to 0° and 90°. This amounts to selecting between the first and second encoding bases, respectively. The N pulses of one clock cycle are modulated independently by Bob and not with the same value. Bob records the phase shift applied and the measurement result (i.e A, B or no photon detected) for each signal pulse in each clock cycle.

In the BB84 protocol, Alice and Bob can form a shared key by communicating on a classical channel after Bob's measurements have taken place. Bob tells Alice in which clock cycle and signal pulse he measured a photon and which measurement basis he used, but not the result of the measurement. Alice then tells Bob the clock cycle and signal pulse in which she used the same encoding basis and they agree to keep only those results, as in this case Bob will have made deterministic measurements upon the encoded photons. Alice and Bob then share a common sifted key, although it may still contain some errors. They can then use classical routines for error correction, to remove any errors in their shared key, and privacy amplification to exclude any information potentially known to an eavesdropper.

Figure 4:
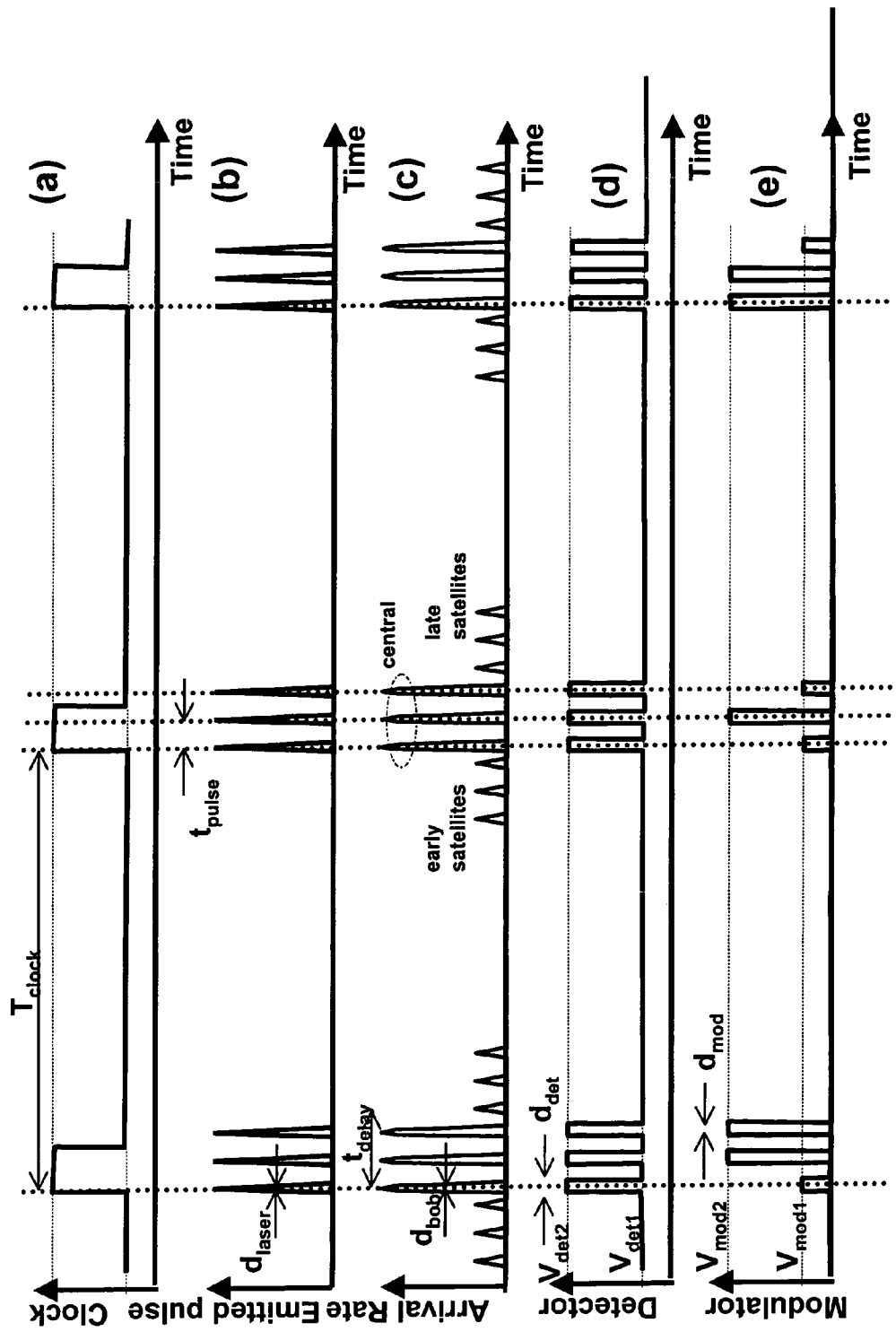
FIGS. 4(a) to 4(e) are a sequence of plots against time schematically how Alice should time her pulses and how Bob should gate the detector using the system of FIG. 3 and in accordance with an embodiment of the present invention.

FIG. 4 shows the timing for a multiple pulse quantum cryptography system. FIG. 4a shows the clock signal as a function of time. The rising edge of the clock pulses is used to define a reference for each clock cycle.

During each clock period $T_{clock}$, Alice's signal laser fires N optical pulses of width $d_{laser}$ with a time delay $t_{pulse}$ between any two adjacent pulses, as shown in FIG. 4b. Typically N will be chosen to be between 2 and 1000. N=3 in the example shown in FIG. 4b.

Such multi-pulse operation of the laser can easily be achieved. One way is to form a trigger for the laser by duplicating the clock signal N times, introducing a delay of $t_{pulse}$ between each duplicated clock, and to then combine the clock signals using an OR-gate. The combined signal is used to trigger driver for the signal laser. In this arrangement, the laser fires N optical pulses upon each clock signal.

Multi-pulse operation can also be achieved using fibre optic components. The signal laser is triggered only once during a clock period to output a single pulse. The signal pulse is fed into 1×N fibre coupler, and the N branches are then combined by a N×1 fiber coupler. The fibre length of each branch is carefully chosen so that the output has N pulses with time separation of $T_{Pulse}$ between any adjacent pulses within a clock. The polarisation of each pulse is controllable to be the same by either using polarisation maintaining fibre couplers or introducing a polarisation controller at each branch of the N×1 fibre coupler.

FIG. 4c plots the probability of a photon arriving at Bob's detectors (i.e. sum of the probabilities at A and B) as a function of time. Each pulse now has a width of $d_{bob}$, which may be greater than $d_{laser}$ due to dispersion in the fibre. Photons may arrive in any one of 3N time windows can be seen for each clock cycle. The first N pulses correspond to photons taking the short arm through Alice's interferometer and the short arm through Bob's interferometer. The central N pulses correspond to photons taking the short-long or long-short paths. The final N pulses correspond to those taking the long-long path.

Only photons arriving in the central N time windows of each clock cycle undergo interference and are thus of interest. The single photon detectors are gated to be on only during the central N time windows in each clock cycle, as shown in FIG. 4d. This is achieved by biasing the detector with a voltage $V_{det2}$ for which it is in an active state for N short gates of duration $d_{det}$ coinciding with the central N time windows. At other times the detector is held at a voltage $V_{det1}$ for which it is inactive. The bias duration $d_{det}$ is chosen to be longer than the width of the arriving pulse $d_{bob}$.

For the case of using an APD as the single photon detector, the APD will be biased above breakdown several times within each clock cycle in close succession. If a photon is detected in one of the signal pulses, and thus an avalanche triggered, it is very likely that an afterpulse count will be generated in one or more of the following detection windows in the same clock cycle. Thus if a photon is detected by one of the detectors, all the following signal pulses within the same clock cycle should be ignored. However, it should be noted that this will not reduce the number of detected photons significantly, since two photons will rarely arrive during the same clock cycle. This point is discussed in further detail below.

After N gates are applied, the APD is biased below its breakdown voltages for the remainder of the clock cycle. This ensures that the afterpulse rate between photons in different clock cycles is strongly suppressed.

Alice and Bob's phase modulators are driven by separate voltage pulse generators. The voltage pulse generators are synchronised with the clock signal, as shown in FIG. 4e. During the pass of each signal pulse through the phase modulator, the pulse generator outputs one of a number of voltage levels, $V_{mod1}$, $V_{mod2}$ etc, as shown in FIG. 4e.

For the BB84 protocol, for instance, Alice applied one of four different voltage levels, corresponding to phase shifts of 0°, 90°, 180°, and 270°. Meanwhile Bob applies two voltage levels to his modulator corresponding to phase shifts of 0° and 90°. Alice and Bob vary the applied phase shifts for each signal pulse randomly and independently of one-another. As illustrated in FIG. 4e, each signal pulse within the clock cycle is modulated independently.

Figure 5:
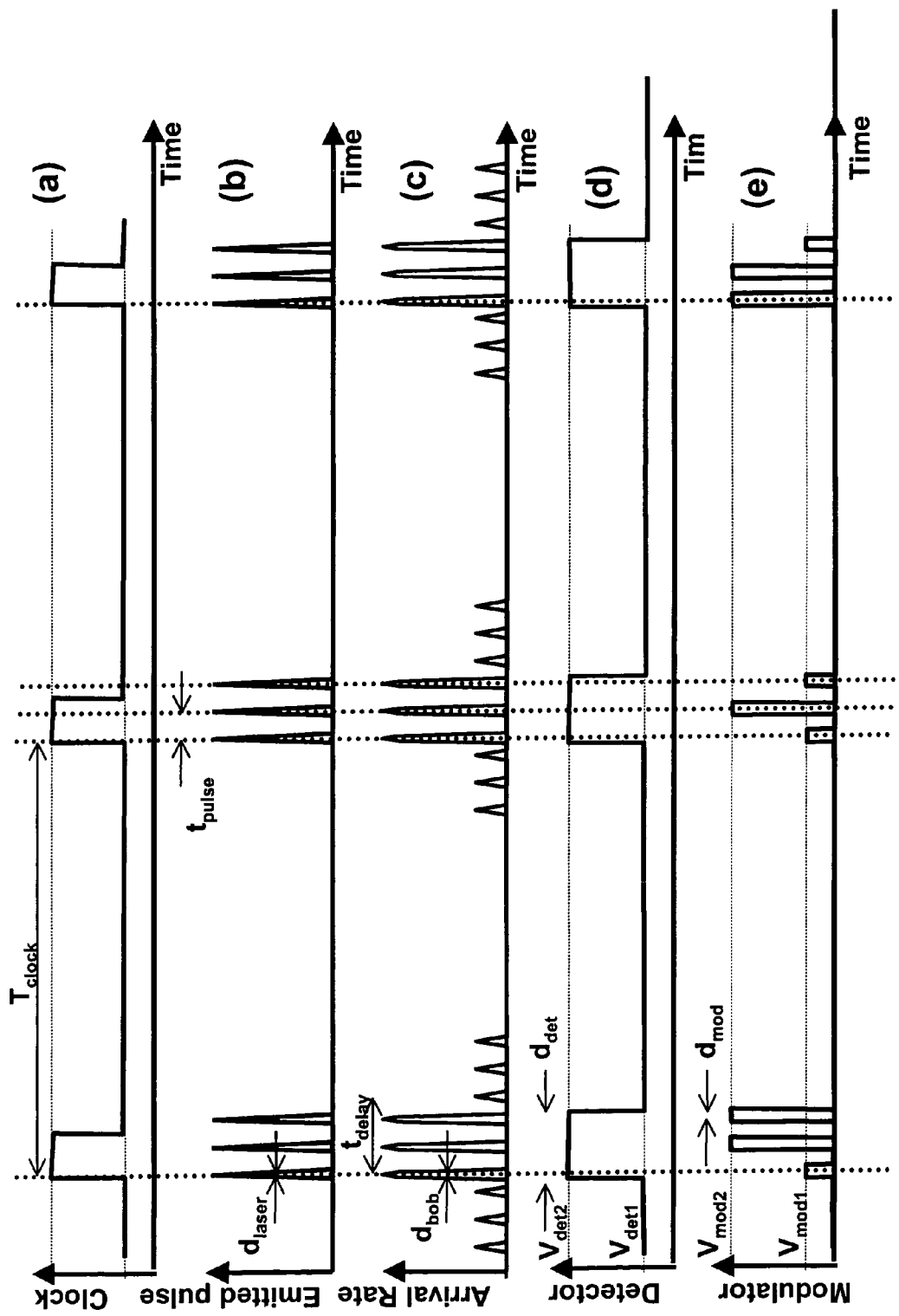
FIGS. 5(a) to 5(e) are a sequence of plots against time schematically how Alice should time her pulses and how Bob should gate the detector using the system of FIG. 3 and in accordance with a further embodiment of the present invention.

FIG. 5 shows another scheme for gating the detector.

FIGS. 5a is a plot of the clock signal as a function of time as per FIG. 4a. FIG. 5b is a plot of the pulses emitted by the signal laser as a function of time as per FIG. 4b. FIG. 5c is a plot of the probability of a photon arriving at either of the detectors 51, 53 as a function of time as per FIG. 4c.

The scheme of FIG. 5 differs from that of FIG. 4, because in the scheme of FIG. 5 a single gate is applied to the detector during each clock cycle. The single gate has a longer duration $d_{det}$ than in FIG. 4d, so as to detect all the central N signal pulses. FIG. 5d shows a plot of the gating signal applied to the detector against time. The detection time is used to determine to which signal pulse within a clock cycle a detected photon belongs. Only the first detected photon within each clock cycle is retained.

FIG. 5e is a plot of the voltage applied to the phase modulators against time as per FIG. 4e.

Figure 6:
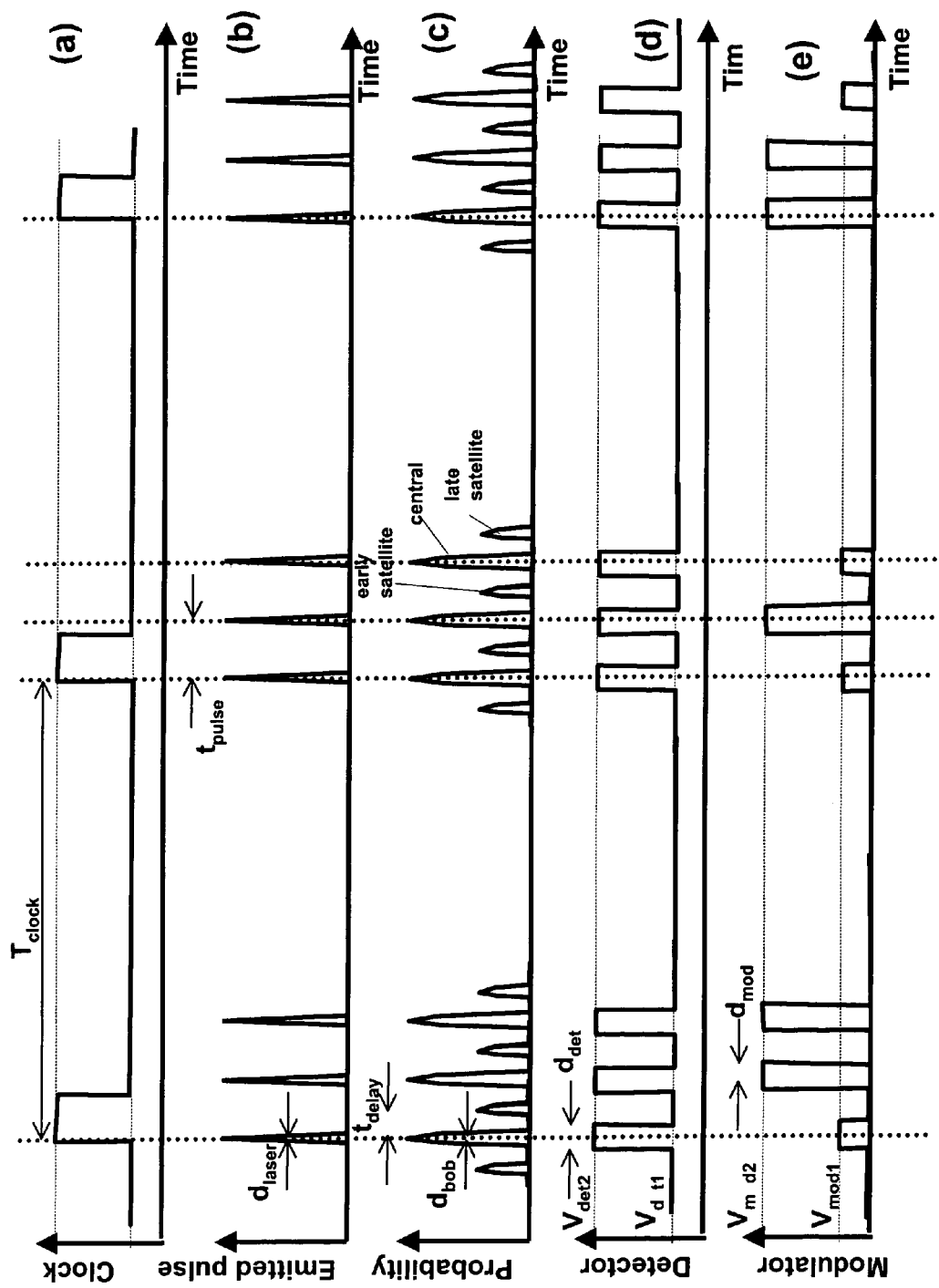
FIGS. 6(a) to 6(e) are a sequence of plots against time schematically how Alice should time her pulses and how Bob should gate the detector using the system of FIG. 3 and in accordance with a yet further embodiment of the present invention.

FIG. 6 shows another scheme for gating the detector, where this time the central and satellite time windows are interlaced.

FIG. 6a is a plot of the clock signal against time as per FIG. 4a.

FIG. 6b is a plot of the pulse emitted by the signal laser against time. The pulses of FIG. 6b are further apart than those of FIGS. 4b and 5b. In this example $t_{pulse}=2\ t_{delay}$. The time between pulses $t_{pulse}$ should be greater than the APD's time resolution, typically 200 ps. It is convenient to choose $t_{delay}=1$ ns, and accordingly $t_{pulse}=2$ ns. Preferably N bias pulses are applied to the APD detectors time to coincide with the central arrival times of the N signal pulses.

FIG. 6c is a plot of the probability of a photon arriving at either of the two detectors against time. The peaks are spaced so that photons from one pulse which take the long-long path coincide with the photons from the next pulse which take the short-short path.

FIG. 6d is a plot of the detector gating voltage against time. It can be seen that the detector switched on when the peaks arrive due to photons taking either of paths (ii) or (iii).

FIG. 6e is a plot of the voltage applied to the phase modulators against time as per FIG. 4e.

Figure 7:
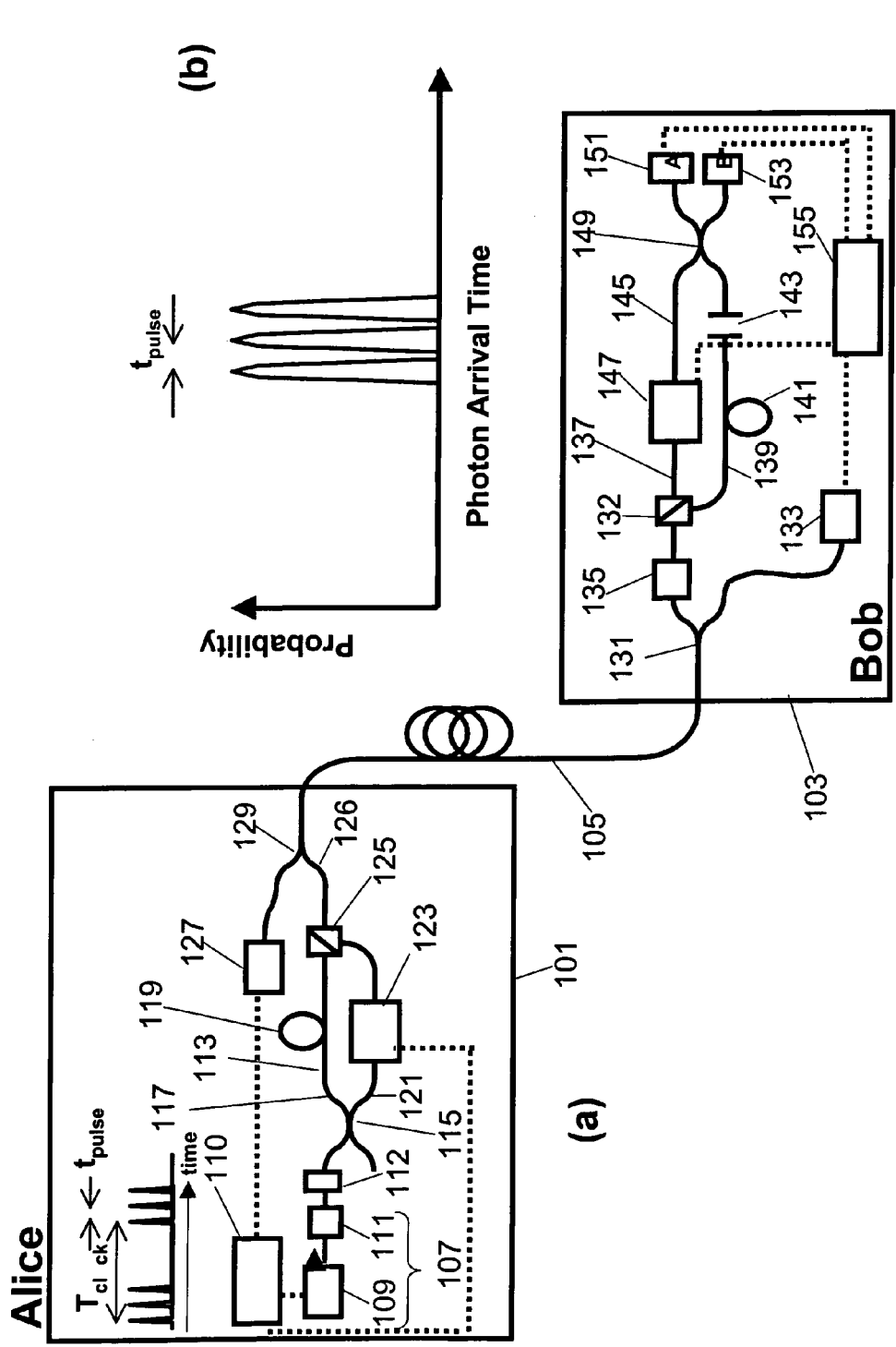
FIG. 7(a) is a communication system in accordance with an embodiment of the present invention and FIG. 7(b) is a schematic plot of the probability of a photon being present in a pulse received by a detector against arrival time at the detector.

FIG. 7a shows a multiple pulse quantum cryptography system based upon phase encoding in a polarisation sensitive fibre interferometer.

Alice's equipment 101 is similar to that described with reference to FIG. 1 and comprises a signal laser diode 109, an attenuator 111, a polarisation rotator 112, an imbalanced fibre Mach-Zender interferometer 113, a bright clock laser 127, a wavelength division multiplexing (WDM) coupler 129 and bias electronics 110.

The interferometer 113 consists of an entrance coupler 115, a long arm 117 with a loop of fibre 119 designed to cause an optical delay, a short arm 121 with a phase modulator 123, and an exit polarising beam combiner 125. All components used in Alice's interferometer 113 are polarisation maintaining.

During each clock signal, the signal diode laser 109 outputs N optical pulses with equal intensities and identical polarisations. The optical pulses are then strongly attenuated by the attenuator 111 so that the average number of photons per signal pulse $\mu<<1$. The signal laser 109 and the attenuator 111 together act as a single photon source 107.

Alternatively the signal pulses may be provided by a single photon source. In this case using a polarised interferometer is preferable.

The linear polarisation of the signal pulses is rotated by a polarisation rotator 112 so that the polarisation is aligned to be parallel to a particular axis of the polarisation maintaining fibre, usually the slow axis, of the entrance coupler 115 of the interferometer 113. Alternatively the polarisation rotator 112 may be omitted by rotating the signal laser diode 109 with respect to the axes of the entrance polarising beam splitter.

The attenuated signal pulses are then fed into the imbalanced Mach-Zender interferometer 113 through a polarisation maintaining fibre coupler 115. Signal pulses are coupled into the same axis, usually the slow axis of the polarisation maintaining fibre, from both output arms of the polarisation maintaining fibre coupler 115.

The long arm 117 of the interferometer 113 contains an optical fibre delay loop 119, while the short arm 121 contains a fibre optic phase modulator 123. As in the apparatus described with reference to FIGS. 1a and 3a, the length difference of the two arms 117 and 121 corresponds to an optical propagation delay of $t_{delay}$. Typically the length of the delay loop 119 may be chosen to produce a delay $t_{delay} \sim 25$ ns. A photon travelling through the long arm 117 will lag that travelling through the short arm 121 by a time of $t_{delay}$ at the exit 125 of the interferometer 113.

The two arms 117, 121 are combined together with a polarisation beam combiner 125 into a single mode fibre 126. The fibre inputs of the polarisation beam combiner 125 are aligned in such a way that only photons propagating along particular axes of the polarisation maintaining fibre, are output from the combiner 125. Typically, photons which propagate along the slow axis and the fast axis are output by combiner 125 into fibre 126.

The polarising beam combiner 125 has two input ports, an in-line input port and a 90° input port (not shown). One of the input ports is connected to the long arm 117 of the interferometer 113 and the other input port is connected to the short arm 121 of the interferometer 113.

Only photons polarised along the slow axis of the in-line input fibre of the in-line input port are transmitted by the polarising beam coupler 125 and pass into the fibre 126. Photons polarised along the fast axis of the in-line input fibre of the input port are reflected and lost.

Meanwhile, at the 90° input port of the beam coupler 125, only photons polarised along the slow axis of the 90° input fibre are reflected by the beam coupler 125 and pass into the output port, while those polarised along the fast axis will be transmitted out of the beam coupler 125 and lost.

This means that the slow axis of one of the two input fibres is rotated by 90° relative to the output port. Alternatively the polarisation may be rotated using a polarisation rotator before one of the input ports of the polarising beam combiner.

Thus, photon pulses which passed through the long 117 and short arms 121 will have orthogonal polarisations.

The signal pulses which are outputted by the coupler 125 into single mode fibre 126 are then multiplexed with a bright laser clock source 127 at a different wavelength using a WDM coupler 129. The multiplexed signal is then transmitted to the receiver Bob 103 along an optical fibre link 105.

The clock may also be delivered in other ways. For example Alice may multiplex the signal pulses with a bright clock laser pulse at the same or different wavelength which is delayed relative to the start of the clock cycle and which does not coincide with the signal pulses. Alternatively the clock signal may be sent on a separate optical fibre. Alternatively, synchronisation may be achieved by using a timing reference.

Bob's equipment 103 comprises WDM coupler 131, a clock recovery unit 133, a polarisation controller 135, an imbalanced Mach-Zender interferometer 137, two single photon detectors 151, 153 and biasing electronics 155. Bob's interferometer 137 contains an entrance polarising beam splitter 132, a long arm 139 containing a delay loop 141 and a variable delay line 143, a short arm 145 containing a phase modulator 147, and an exit polarisation maintaining 50/50 fibre coupler 149. All components in Bob's interferometer 137 are polarisation maintaining.

Bob first de-multiplexes the transmitted signal received from fibre 105 using the WDM coupler 131. The bright clock laser 127 signal is routed to an optical receiver 133 to recover the clock signal for Bob to synchronise with Alice.

If Alice delivers the clock using an alternative method, Bob will recover the clock accordingly. If Alice sends the clock signal as a single bright pulse within each clock cycle which is delayed relative to signal pulses then Bob may use an imbalanced coupler, such as 90/10, to extract a fraction of the combined signal which is measured with a photo-diode. A clock pulse is then recovered if the incident intensity is above an appropriately set threshold. Alternatively Bob may detect the clock on a separate fibre or using a timing reference.

The signal pulses which are separated from the clock pulses by WDM coupler 131 are fed into a polarisation controller 135 to restore the original polarisation of the signal pulses. This is done so that signal pulses which travelled the short arm 121 in Alice's interferometer 113, will pass the long arm 139 in Bob's interferometer 137. Similarly, signal pulses which travelled through the long arm 117 of Alice's interferometer 113 will travel through the short arm 145 of Bob' interferometer.

The signal then passes Bob's interferometer. An entrance polarising beam splitter 132 divides the incident pulses with orthogonal linear polarisations. The two outputs of the entrance polarisation beam splitter are aligned such that the two output polarisations are both coupled into a particular axis, usually the slow axis, of the polarisation maintaining fibre. This ensures that signal pulses taking either arm will have the same polarisation at the exit 50/50 polarisation maintaining coupler 149. The long arm 139 of Bob's interferometer 137 contains an optical fibre delay loop 141 and a variable fibre delay line 143, and the short arm 145 contains a phase modulator 147. The two arms 139, 145 are connected to a 50/50 polarisation maintaining fibre coupler 149 with a single photon detector 151, 153 attached to each output arm.

Due to the use of polarising components, there are only two routes for a signal pulse travelling from the entrance of Alice's interferometer to the exit of Bob's interferometer:
(i) Alice's Long Arm 117—Bob's Short Arm 145 and
(ii) Alice's Short Arm 121—Bob's Long Arm 139.

The variable delay line 143 at Bob's interferometer 137 is adjusted to make the propagation time along routes (i) and (ii) almost equal, within the signal laser coherence time which is typically a few picoseconds for a semiconductor distributed feed back (DFB) laser diode, and thereby ensure interference of the two paths.

The variable fiber delay line 143 can either be an airgap, or a fibre stretcher, driven by a piezo-electric actuator. Alternatively, the two delays can be balanced by carefully controlling the length of fibre in Alice's 113 and Bob's 137 interferometers. Fine adjustment of the length of the two optical paths can be achieved through the calibration of zero phase delay in the two modulators.

The advantage of such a scheme is that the satellite pulses for which the photons take the short-short paths or long-long paths through Alice's and Bob's interferometers are suppressed, as can be seen in FIG. 7b. This allows shorter delay loops to be used. For example, a delay loop corresponding to $t_{delay}$=5 ns is sufficient.

Since a weak satellite signal pulses from the short-short and long-long paths through Alice's-Bob's interferometer may persist, it is still preferable if the central time windows do not coincide with the satellite time windows. This may be achieved if $t_{delay}$>N $t_{pulse}$. Alternatively, the central time windows can be interlaced with satellite time windows, so that the satellite time windows do not coincide with the central time windows, by taking for example $t_{pulse}$=2 $t_{delay}$. For the latter we may choose $t_{delay}$=1 ns and $t_{pulse}$=2 ns.

Figure 8:
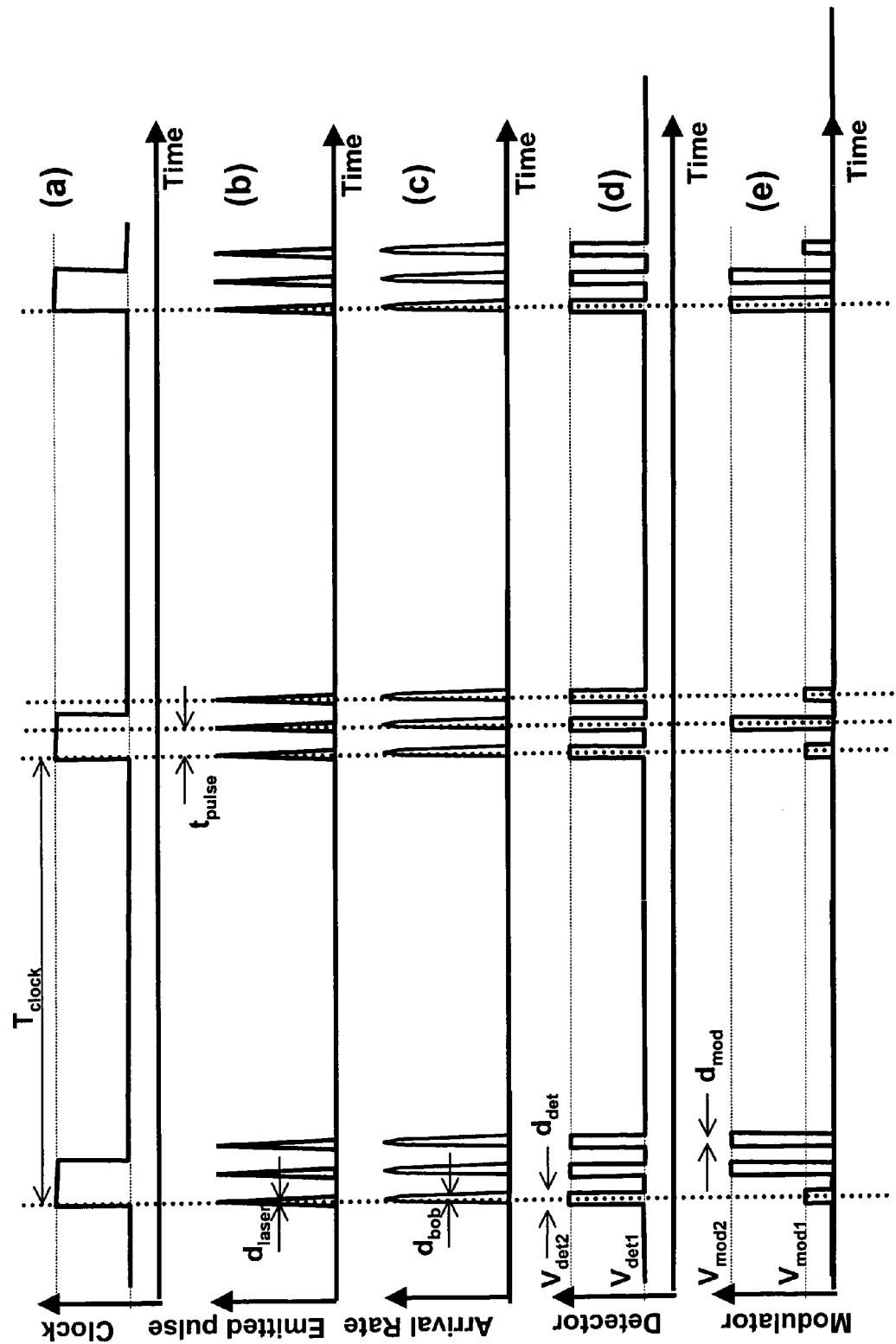
FIGS. 8(a) to 8(e) are a sequence of plots against time schematically how Alice should time her pulses and how Bob should gate the detector using the system of FIG. 7 and in accordance with an embodiment of the present invention.
Figure 9:
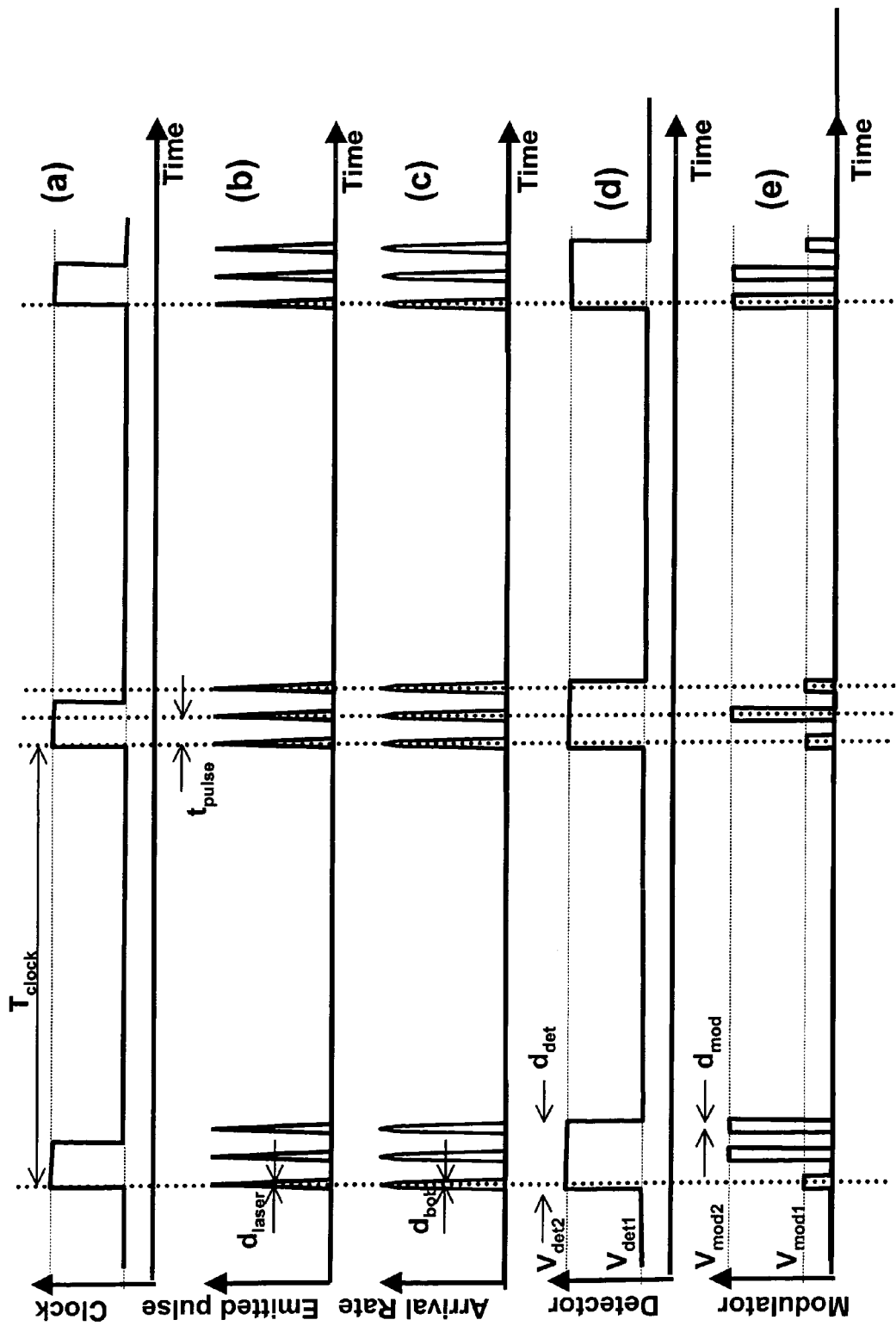
FIGS. 9(a) to 9(e) are a sequence of plots against time schematically how Alice should time her pulses and how Bob should gate the detector using the system of FIG. 7 and in accordance with a further embodiment of the present invention.

FIGS. 8 and 9 are plots showing timing schemes for the various components of the system described with reference to FIG. 7a. These schemes are similar to those described with reference to FIGS. 4 to 6.

FIG. 8a is a plot of the clock signal against time as per FIG. 4a. FIG. 8b is a plot of the pulses emitted by the signal laser against time as per FIG. 4b.

FIG. 8c is a plot of the probability of the probability of a photon arriving at either of Bob's detectors 151 and 153 against time. Due to the polarisation restrictions imposed by Alice's polarising beam combiner 125 and Bob's polarising beam splitter 132, only photons which pass through the short arm of one interferometer and the long arm of the other should arrive at the detectors. Therefore, the satellite peaks of FIG. 4c should not be present.

FIG. 8d is a plot of the detector gating voltage against time. It can be seen that the detector switched on to coincide with the peaks shown in FIG. 8c.

FIG. 8e is a plot of the voltage applied to the phase modulators against time as per FIG. 4e.

FIG. 9a is a plot of the clock signal against time as per FIG. 4a. FIG. 9b is a plot of the pulses emitted by the signal laser against time as per FIG. 4b.

FIG. 9c is a plot of the probability of the probability of a photon arriving at either of Bob's detectors 151 and 153 against time. Due to the polarisation restrictions imposed by Alice's polarising beam combiner 125 and Bob's polarising beam splitter 132, only photons which pass through the short arm of one interferometer and the long arm of the other should arrive at the detectors. Therefore, the satellite peaks of FIG. 4c should not be present.

FIG. 9d is a plot of the detector gating voltage against time. It can be seen that the detector switched on for the whole time when pulses from a single clock cycle are expected to arrive at the detector.

FIG. 9e is a plot of the voltage applied to the phase modulators against time as per FIG. 4e.

Figure 10:
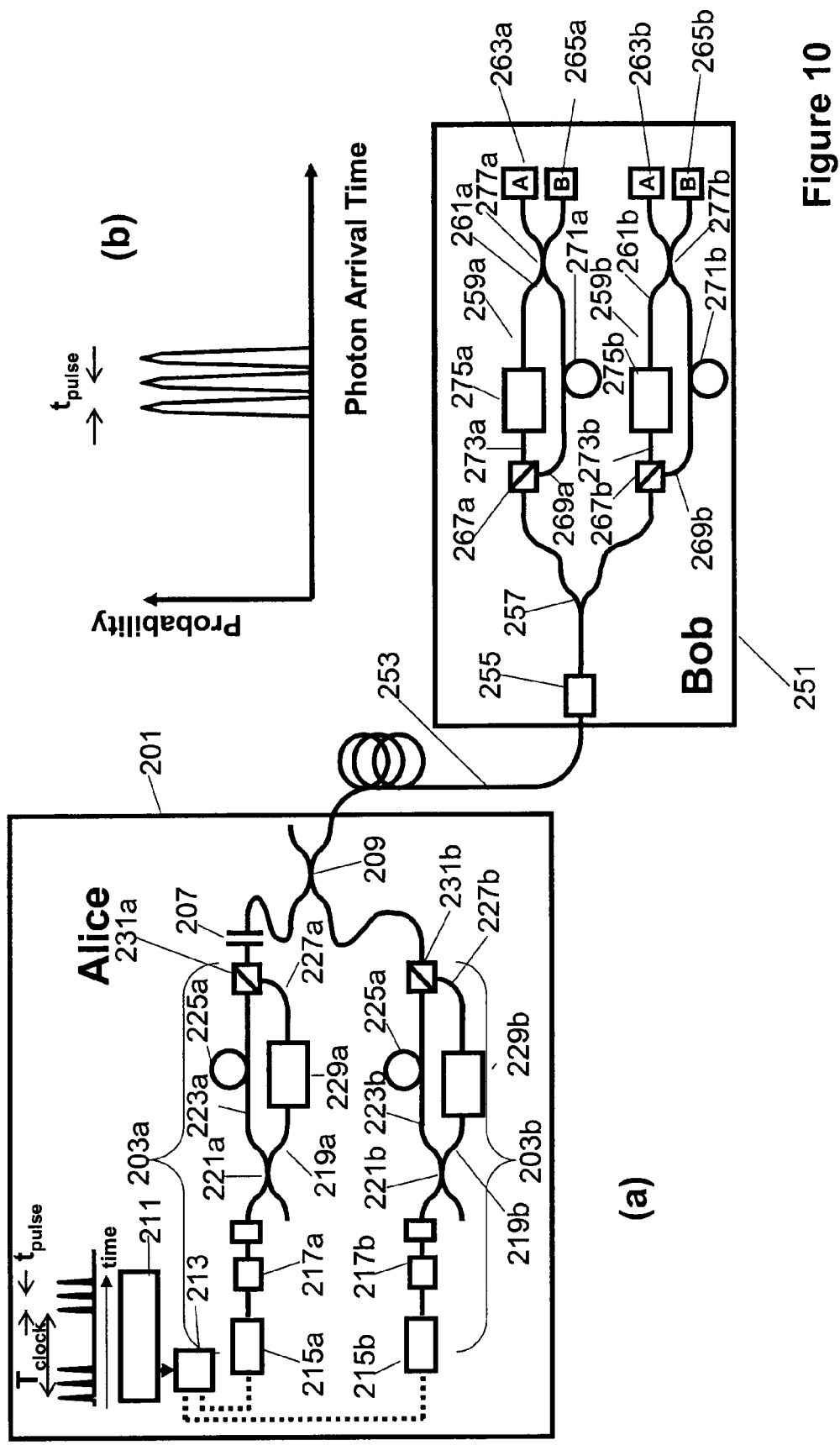
FIG. 10(a) is a communication system in accordance with an embodiment of the present invention and FIG. 10(b) is a schematic plot of the probability of a photon being present in a pulse received by a detector against arrival time at the detector.

FIG. 10a shows an apparatus for passive phase encoded multiple pulse quantum cryptography. In the previous examples each signal pulse was encoded by applying one of a number of different phase shifts to the phase modulators and the phase shift was varied randomly between signal pulses. In the case of passive encoding, a signal pulses are split into a number of different routes and a constant phase shift is applied to each route. The advantage of this approach is that it avoids fast modulation of the phase modulator.

Alice's equipment 201 comprises a first encoding sub-system 203a, a second encoding sub-system 203b, a variable delay line 207, a coupler 209, a WDM coupler (not shown), a clock laser (not shown), device biasing electronics 211, and an electrical switch 213.

The first encoding sub system 203a and second encoding sub-system 203b are similar to those described with reference to FIG. 7a.

Each encoding subsystem 203a, 203b, comprises a single photon source provided by a signal laser 215a, b which is passed through attenuator 217a, b. The photon pulses may also be generated by a single photon source.

The attenuated signal pulses from attenuators 217a and 217b are fed into imbalanced Mach-Zender interferometers 219a and b respectively through fibre optical coupler 221a and 221b respectively. As described with reference to FIG. 1a interferometers 219a and 219b both have a long arm 223a, b with an optical fibre delay loop 225a, b and both have a short arm 227a, b with a fibre optic phase modulator 229a, b.

The length difference between the long arms 223a, b and short arms 227a, b of the interferometers 219a, b corresponds to an optical propagation delay of $t_{delay}$. Thus, a photon travelling through the long arm 223a, b will lag that travelling through the short arm 227a, b by a time of $t_{delay}$ at the exit of the interferometer 219a, b. The long arm 223a, b and the short arm 227a, b of each interferometer 219a, b are combined together with a polarising beam coupler 231a, b. The polarising beam coupler has been described with reference to FIG. 7.

The signal laser diodes 215a, b within the first and second encoding sub-systems 203a, b are chosen to emit at the same wavelength so as to prevent eavesdropping using spectroscopic measurements.

A multiple pulse laser trigger signal is generated in a similar manner to that described previously. The laser trigger is fed either to the laser driver in the first encoding sub-system 203a or the laser driver in the second encoding subsystem 203b by a switch 213. The choice of which encoding subsystem is triggered for each signal pulse is random and is recorded by Alice. Alice may chose between the two encoding sub-systems 203a, 203b using a random bit generator.

The laser trigger signal will cause a pulse to be generated by the laser diode in either the first 203a or second 203b encoding system. The phase modulators 229a, b within the encoding sub-systems 203a, b are set to generate a fixed phase delay which differs for the first and second encoding sub-systems 203a, b.

The outputs from the two encoding sub-systems 203a, b are combined together with a polarisation maintaining fibre coupler 209. The optical path lengths up to the polarisation maintaining fibre coupler 209 are controlled so that a signal pulse exits the coupler at the nearly same time irrespective if it travelled the first or the second encoding sub-systems 203a, 203b. This is to ensure that an eavesdropper cannot determine the encoded state by measuring the arrival time of the signal pulse. This can be achieved either by careful control of the length of fibres joining the output of the encoding sub systems to the coupler, or optionally by using a variable delay line 207.

The signal laser pulse arrival times at the polarisation maintaining coupler can also be synchronised using an electronic delay applied to the triggering signal of one of the signal laser diodes 215a, 215b.

The output of the polarisation maintaining coupler 209 may then be combined with clock signal using a WDM coupler (not shown), as described previously with reference to FIG. 7a.

The clock may also be delivered in other ways. For example Alice may multiplex the signal pulses with a bright clock laser pulse at the same or different wavelength which is delayed relative to the start of the clock cycle and which does not coincide with the signal pulses. Alternatively the clock signal may be sent on a separate optical fibre. Alternatively, synchronisation may be achieved by using a timing reference.

The combined signal is then transmitted to the receiver Bob 251 along optical fibre 253.

Bob's set up consists of a WDM coupler (not shown), clock recovery unit (not shown), a polarisation controller 255, a polarisation maintaining fibre coupler 257, a first measurement sub-system 259a, a second measurement sub-system 259b and bias electronics (not shown). The measurement sub-systems 259a and 259b are similar to that described with reference to FIG. 7a.

Bob first uses a WDM coupler (not shown) to split off and recover the clock signal for synchronisation with Alice.

If Alice delivers the clock using an alternative method, Bob will recover the clock accordingly. If Alice sends the clock signal as a single bright pulse within each clock cycle which is delayed relative to signal pulses then Bob may use an imbalanced coupler, such as 90/10, to extract a fraction of the combined signal which is measured with a photo-diode. A clock pulse is then recovered if the incident intensity is above an appropriately set threshold. Alternatively, Bob may detect the clock on a separate fibre or using a timing reference.

A polarisation controller 255 restores the polarisation of signal pulses which are then fed into a polarisation maintaining coupler 257.

Since the signal pulses comprises single photon signals they will exit either the first or the second output arm of the polarisation maintaining coupler, which are fed into the first 259a and second 259b measurement subsystems respectively.

Each measurement subsystem comprises an imbalanced Mach-Zender interferometer 261a, b and two single photon detectors: 263a and b; 265a and b. Each of the two interferometers 261a, 261b comprises an entrance polarising beam splitter 267a, b, a long arm 269a, b containing a delay loop 271a, b, a short arm 273a, b containing a phase modulator 275a, b and an exit polarisation maintaining 50/50 fibre coupler 277a, b. All components in Bob's two interferometers 261a, 261b are polarisation maintaining.

When a pulse is passed into one of the interferometers 261a, 261b, the entrance polarising beam splitter 267a, b divides the incident pulses with orthogonal linear polarisations. The two outputs of the entrance polarisation beam splitter 267a, 267b are aligned such that the two output polarisations are both coupled into a particular axis, usually the slow axis, of the polarisation maintaining fibre. This ensures that signal pulses taking either the long arm 269a, b or the short arm 273a, b will have the same polarisation at the exit 50/50 polarisation maintaining coupler 277a, b.

The polarising beam splitters 267a and 267b are set to ensure that only photons which have passed through the short arm of one of Alice's interferometers pass through the long arm of one of Bob's interferometers and only photons which have passed through the long arm of one of Alice's interferometers pass through the short arm of one of Bob's interferometers.

FIG. 10b is a plot of the probability of a photon reaching the detector against time for the apparatus of FIG. 10a.

The phase modulators in the measurement sub-systems are set to a fixed value which differs for the first and second measurement subsystem.

It is essential that the optical delay $t_{delay}$ between the Long and Short Arms is identical for the four interferometers. This can be achieved by using variable delay lines within each interferometer. The variable fiber delay lines can either be an airgaps, or a fibre stretchers, driven by a piezo-electric actuators. Alternatively the length of the fibre components can be carefully matched in each interferometer. Small adjustments to the phase delay can be made through the calibration of zero delay for each phase modulator.

For passive encoding the phase modulators may be operated in DC mode. A constant DC voltage is applied on each phase modulator to achieve a constant phase shift. This may be changed from time to time to calibrate the system.

The system in FIG. 10a is suitable for implementing the two-state protocol known as B92. In this case only one detector is needed on one output arm of each measurement subsystem. The phase modulators are calibrated so that for zero phase delay the photon rate into each detector is maximum.

For the B92 protocol the first and second encoding subsystems apply phase shifts of 0 and 90°, respectively. Alice associates a pulse routed through the first (phase shift=0°) encoding sub-system with bit=0. Similarly she associates a pulse routed through the second (phase shift=90°) encoding system with bit=1. The first and second measurement subsystems apply phase shifts of 180 and 270°, respectively. Bob associates a count in the first (phase shift=180°) measurement sub-system with bit=1. He associates a count in the second (phase shift=270°) measurement sub-system with bit=0.

Alice notes through which encoding sub-system each signal pulse in each clock cycle was routed. Bob notes for which clock cycle and signal pulse he detected a photon and in which measurement sub-system it was recorded. After Bob's detections, he tells Alice in which clock cycle and signal pulse he detected a photon (but not which detector) and they keep these bits to form a shared sifted key. They then perform error correction and privacy amplification upon the sifted key.

The above discussion relates to the B92 protocol. However, it can be modified to work for the four state protocol BB84 by arranging four encoding sub-systems with phase shifts of 0°, 90°, 180° and 270° and two measurement sub-systems with phase shifts of 0° and 90° and with a detector on both output arms of each measurement sub-system.

Figure 11:
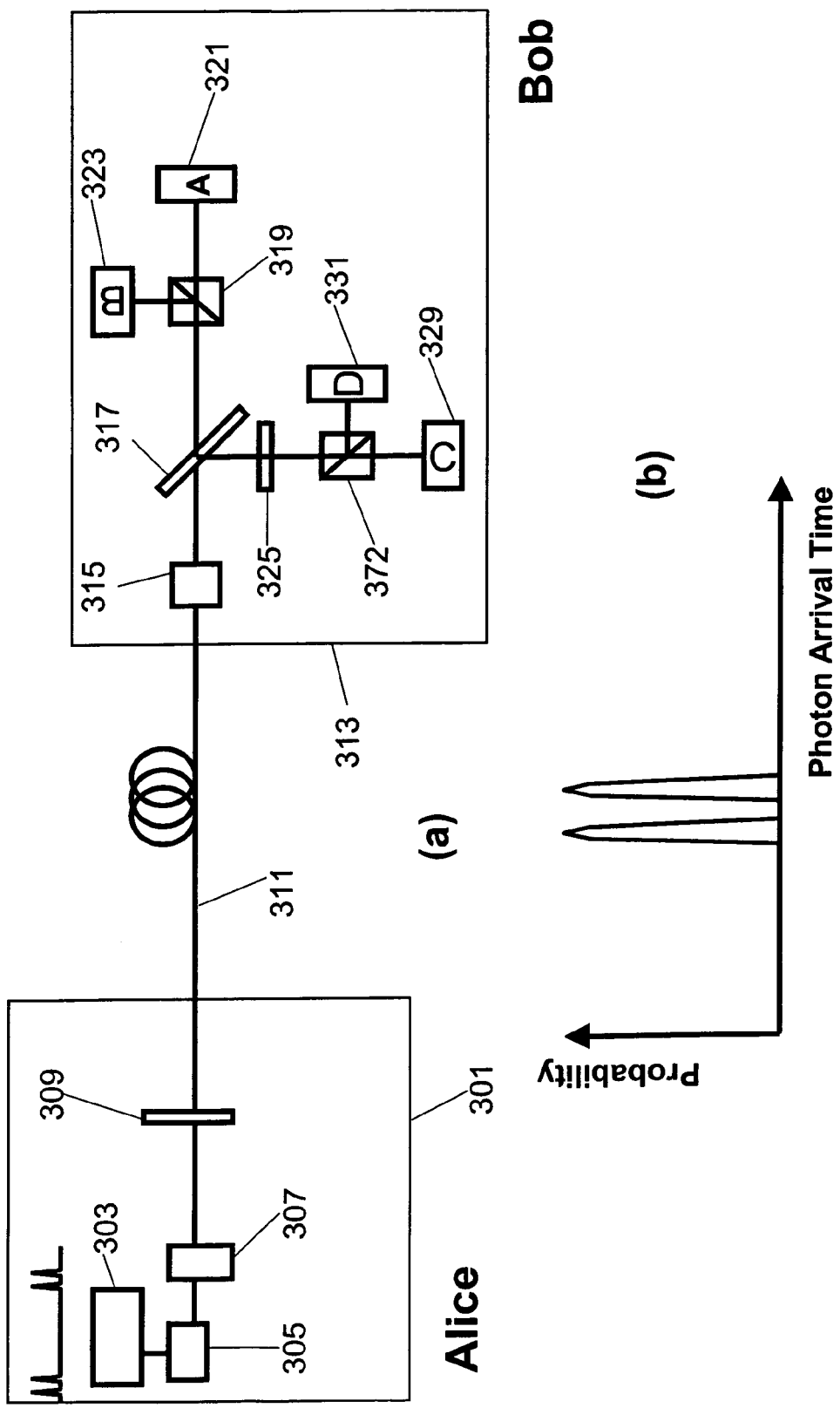
FIG. 11(a) is a communication system in accordance with an embodiment of the present invention and FIG. 11(b) is a schematic plot of the probability of a photon being present in a pulse received by a detector against arrival time at the detector.

FIG. 11a shows an apparatus for multiple pulse quantum cryptography systems based on polarisation encoding.

Alice's equipment 301 comprises biasing electronics 303 which outputs a biasing signal to a signal laser 305 which outputs pulses in response to the biasing signal. During each clock signal, the signal diode laser outputs N optical pulses with equal intensities and identical polarisations. The optical pulses are then strongly attenuated by attenuator 307 so that the average number of photons per signal pulse leaving Alice $\mu<<1$.

The signal pulses are then randomly and individually encoded using a polarisation rotator 309 to have one of four possible polarisation angles: 0°, 90°, 45° and 135°. The encoded photons are then transmitted to the receiver Bob 313 along an optical fibre link 311.

Bob 313 first uses a polarisation controller 315 to recover the original polarisation of the signal pulses. The signal pulses are divide using a 50/50 non-polarising beam splitter 317.

The transmitted photons are analysed with a polarisation beam splitter 319 and two single photon detectors A 321 and B 323. The reflected photons will first pass through a 45° polarisation rotator 325, and then be analysed by a polarisation beam splitter 327 and two single photon detectors C 329 and D 331. Alternatively the polarisation rotator can be omitted and the second polarisation beam splitter 327 can be rotated by 45°.

This set-up can be used to implement quantum key distribution using the BB84 or B92 protocols as previously described. However, in this example, polarisation as opposed to phase is used to encode the photons.

Figure 12:
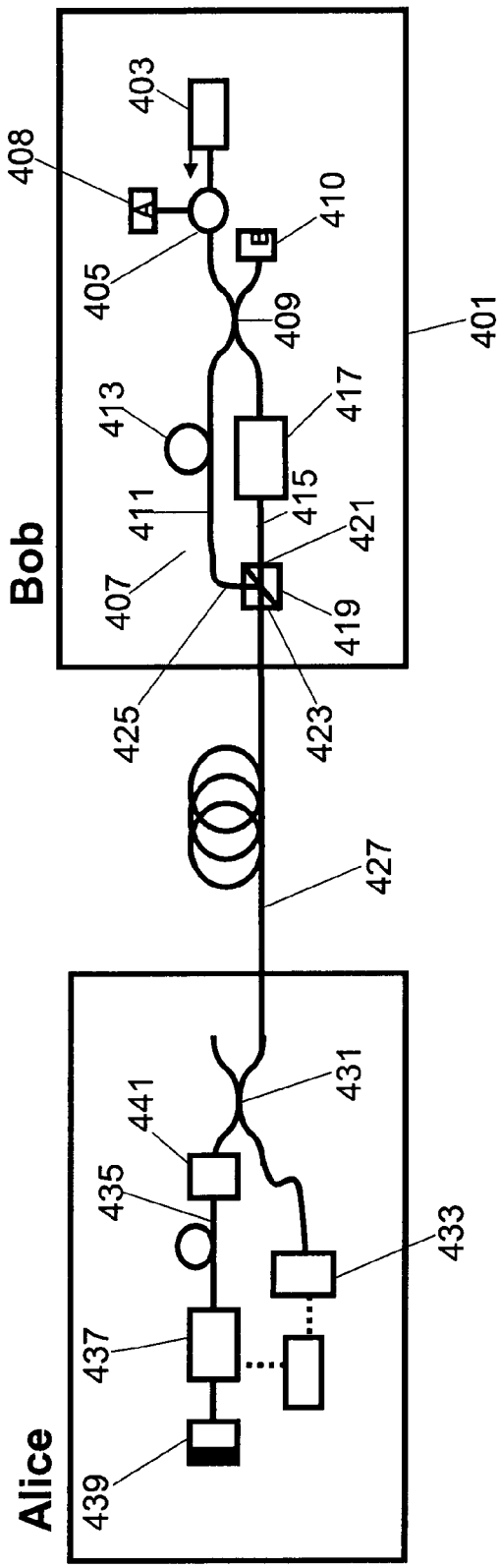
FIG. 12 is a self-compensating apparatus for multiple pulse quantum cryptography in accordance with an embodiment of the present invention.

FIG. 11b is a plot of the probability of a signal reaching the detector against time for the apparatus of FIG. 11a FIG. 12 shows a self-compensating apparatus for multiple pulse quantum cryptography.

Bob's equipment 401 comprises a signal laser diode 403, a fibre circulator 405, an imbalanced Mach-Zender polarisation maintaining fibre interferometer 407, and two single photon detectors 408, 410.

Bob's Mach-Zender interferometer 407 contains a 50/50 polarisation maintaining fibre coupler 409, a long arm 411 with a fibre delay loop 413, a short arm 415 with a phase modulator 417, a polarisation beam splitter 419, and biasing electronics (not shown).

The biasing electronics produce a clock signal for synchronisation with period $t_{clock}$, which may typically be 1 µs. The laser diode is bias to emit a number (N) of signal pulses during each clock cycle. Consecutive signal pulses with one clock cycle have a temporal separation of $t_{pulse}$ which may typically be chosen to be 2 ns.

The laser 403 is linearly polarised. The laser pulses are coupled into a particular polarisation axis, usually the slow axis, of a polarisation maintaining fibre.

The signal pulses are then fed into the imbalanced interferometer 407 through a circulator 405 and a polarisation maintaining fibre coupler 409. The length difference between the long arm 411 and the short arm 415 of the interferometer corresponds to an optical propagation delay of $t_{delay}$. A pulse travelling through the long arm 411 (referred to below as the 'late pulse') will lag that travelling through the short arm 415 ('early pulse') by a time delay at the port 423 of the polarisation beam combiner/splitter 419 of the interferometer 407.

The long arm 411 and the short arm 415 are combined with a polarisation beam splitter 419. The fibre inputs of the polarisation beam combiner 419 are aligned in such a way that only photons propagating along a particular axis of the polarisation maintaining input fibre, usually the slow axis, are output from the combiner. For example, at the in-line input port 421, only photons polarised along the slow axis of the in-line input fibre are transmitted by the beam combiner/splitter 419 and pass into the output port 423 and photons polarised along the fast axis are reflected and lost. Meanwhile, at the 90° input port 425, only photons polarised along the slow axis of the 90° input fibre are reflected by the beam combiner 419 and pass into the output port, while those polarised along the fast axis will be transmitted and lost.

This means that the slow axis of one of the two input fibres is rotated by 90° relative to the output port. Alternatively the polarisation may be rotated using a polarisation rotator before one of the input ports of the polarising beam combiner. Thus photon pulses which passed through the long 411 and short 415 arms will have orthogonal linear polarisations on the output fibre 427.

The pulses are then transmitted to Alice along an optical fibre link. No further clock signal need be sent. The pulses are not attenuated before they are sent.

Alice first uses a fibre coupler 431 with an unbalanced coupling ratio, for example 90/10, to route 90% of signal into a photodetector 433 to measure the signal pulse intensity and also recover the clock.

The clock recovery electronics is designed to respond only to the first signal pulse in each clock cycle and to ignore the following ones. This may be achieved if the clock recovery electronics applies a dead time exceeding N $t_{pulse}$ but less than $t_{clock}$.

The exit from other arm of the fibre coupler is fed into a storage line 435 after passing an attenuator 441, then a phase modulator 437, and a Faraday mirror 439. The Faraday mirror 439 has the effect of rotating the polarisation of the incident pulses by 90°. The signal pulses reflected by the Faraday mirror pass back through the phase the modulator 437, the storage line 435, the attenuator 441 and the fibre coupler 431 subsequently. The reflected pulses then return to Bob along the optical fibre link.

Alice applies a voltage to her phase modulator when the early (ie that which passed through the phase modulator 417 in Bob's interferometer) pulse passes back through her phase modulator after reflection at the Faraday mirror.

Before the pulses leaving Alice's coupler, they are attenuated so that the average number of photons per pulse $\mu \ll 1$. The level of attenuation is chosen according to the signal pulse intensity measured by the Alice's power meter 433.

When the signal pulses return to Bob's polarisation beam splitter, the polarisations of each early and late pulse have been swapped due to the reflection of the Faraday mirror 439 in Alice's equipment. So, the late pulse will be transmitted by the beamsplitter and propagate along the Short Arm, while the early pulse will be reflected into the Long Arm. They will then be fed into the polarisation maintaining fibre coupler.

There are two routes for a photon travelling from the Bob's fiber coupler to Alice and then reflected back to the Bob's coupler:
1. Bob's Long Arm—Alice—Bob's Short Arm
2. Bob's Short Arm—Alice—Bob's Long Arm The total length is exactly identical because a photon passes all the same components but just with different sequences. There is no need to actively balance the length of the two routes, as they are virtually the same and are automatically self-compensated. A photon passing two routes interferes with itself at Bob's polarisation maintaining fibre coupler.

By controlling the voltages applied to their modulators when the reflected pulses passing through, Alice and Bob determine in tandem whether two routes undergo constructive or destructive interference at each detector. Alice only modulates the reflected early pulse, while Bob modulates the reflected late pulse.

The polarisation maintaining fibre coupler at Bob's interferometer is attached to two single photon detectors, one of which is through a fibre circulator. This arrangement can be used to implement BB84 or B92 in a similar manner to those described previously.

The self-compensating arrangement has the advantage that it allows a long value of $t_{delay}$ to be used. Thus this method is particular well suited to the biasing scheme shown in FIG. 4. For example N may be chosen to be 200, $t_{pulse}=2$ ns and $t_{delay}=550$ ns.

The systems explained with reference to FIGS. 3 to 12 use multiple pulses whereas the prior art systems explained with reference to FIGS. 1 and 2 used single pulses. Comparing the bit rates achievable using both systems:

The probability of a photon detection for each signal pulse is given by $$P = A\mu P_{fibre} P_{bob} P_{det}$$

where $\mu$ is the average number of photons per pulse generated by Alice, $P_{fibre}$ is the transmission of the fibre, $P_{bob}$ is the transmission of Bob's equipment, $P_{det}$ is the efficiency of Bob's detectors and A is a factor depending upon the efficiency of the protocol used. For BB84, A=0.5 and for B92, A=0.25.

For single pulse quantum cryptography, the sifted bit rate, before error correction and privacy amplification, will be given by $$B_{sp} = P/T_{clock,sp}$$

In order to make a fair comparison, it is assumed that the time interval from the final pulse in one clock cycle to the first in the next clock cycle is identical for the two techniques. This ensures that the afterpulse rate between successive clock cycles will be no worse for multiple pulse quantum cryptography than for a single pulse system. In other words the clock period for multiple pulse quantum cryptography should be longer and given by $$T_{clock,mp} = T_{clock,sp} + (N-1)t_{pulse}$$

where N is the number of pulses per clock cycle.

The bit rate for multiple pulse quantum cryptography is thus given by $$B_{mp} = (1/T_{clock,mp})(P + P(1 - P - P_d) +$$
$$P(1 - P - P_d)^2 + \ldots + P(1 - P - P_d)^{N-1})$$
$$= 1 - (1 - P - P_d)^N / T_{clock,mp}$$

where $P_d$ is the probability of a dark count and the factor of $(1-P-P_d)^n$ derives from the fact that a photon is only counted if there has been no photon detected in the previous pulses within that same clock cycle.

The ratio of the bit rates is therefore given by $$B_{mp}/B_{sp} = (1 - (1-P-P_d)^N) T_{clock,sp} / P(T_{clock} + (N-1)t_{pulse})$$

The attenuation in standard optical fibre at 1.55 μm is 0.2 dB/km. The transmission of a 50 km length of fibre is thus $P_{fibre}=0.1$. Typically $\mu=0.1$, $P_{bob}=0.5$ and $P_{det}=0.2$. Thus for a 50 km length of fibre and the BB84 protocol, $P=5\times10^{-4}$. Meanwhile the dark count rate is typically $P_d=10^{-5}$ for an APD detector.

FIG. 13a and b plot the ratio of the bit rates as a function of N, for a single pulse clock period $T_{clock,sp}=1$ μs and $t_{pulse}=2$ ns.

For small values of N it can be seen that the bit rate increases linearly with N. Indeed in the limit that $P \ll 1$, we can write $$B_{mp}/B_{sp} \sim N T_{clock,sp}/(T_{clock} + (N-1)t_{pulse})$$

If $N \ll (T_{clock}/t_{pulse})$, then the enhancement of the bit rate is given by $$B_{mp}/B_{sp} \sim N$$

For higher values of N, the probability of two photons arriving in the same clock cycle increases. In this situation, the longer clock period for multi-pulse quantum cryptography becomes a disadvantage. This causes the enhancement in the bit rate to saturate and eventually decrease at the highest values of N. However, it is clear from FIG. 13 that a very large enhancement in the bit rate by two orders of magnitude can be achieved with technology available today. A preferable value of N is 200 to achieve an enhancement in bit rate of about ~100 compared to a 1-pulse system.

The invention claimed is:
1. A quantum communication system comprising:
   an emitter configured to emit a plurality of photon pulses in groups of photon pulses, each group of photon pulses emitted over a group time period, wherein the average number of photons per pulse is less than 1;
   a detector comprising gating means configured to switch the detector between an on state and an off state;
   wherein the separation between pulses in said group of pulses is less than the time when a detector may register an after pulse signal or a false positive reading, the detector is in an on state for at least the duration of two photon pulses during said group time period, and the system is configured to ignore a second or subsequent pulse received by the detector in a group time period after a first pulse has been detected for the group of pulses.

2. The system of claim 1, wherein the detector is in an on state for the whole of said group time period.

3. The system of claim 1, wherein the detector is repetitively switched on and off during said group time period, so as to be on during the arrival of the photon pulses.

4. The system of claim 1, further comprising means to communicate a clock signal between the emitter and detector.

5. The system of claim 4, wherein a clock pulse of the clock signal is sent from the emitter to the detector with each group of photon pulses.

6. The system of claim 5, wherein the clock signal has a different wavelength to that of the photon pulses.

7. The system of claim 5, wherein the clock signal has a different polarisation to that of the photon pulses.

8. The system of claim 1, wherein the detector comprises an avalanche photodiode.

9. The system of claim 1, wherein the photons which are sent to the detector are encoded.

10. The system of claim 9, wherein the each photon pulse in a group of photon pulses is encoded by a phase encoding means independently of the other pulses in the group of photon pulses.

11. The system of claim 9, wherein the photon pulses are encoded by manipulating phase of the photon pulses to encode information in the photon pulses.

12. The system of claim 11, further comprising a first interferometer comprising a long arm and a short arm, one of said arms comprising phase variation means configured to set the phase of a photon passing through that arm to one of at least two values.

13. The system of claim 12, further comprising a second interferometer comprising a long arm and a short arm, one of said arms comprising phase variation means configured to set the phase of a photon passing through that arm to one of at least two values.

14. The system of claim 13, the detector being further configured to ignore signals from photon pulses which pass through the long arms of both interferometers or the short arms of both interferometers.

15. The system of claim 13, further comprising directing means configured to ensure that photons which have passed through the short arm of the first interferometer are directed down the long arm of the second interferometer and photons which have passed through the long arm of the first interferometer pass through the short arm of the second interferometer.

16. The system of claim 15, wherein the directing means comprises first polarising means configured so that photons which have travelled through different arms of the first interferometer have different polarisations, and second polarising means which distinguish between the photons having different polarisations and direct them down the appropriate arm of the second interferometer.

17. The system of claim 13, further comprising means to vary the path length of one of the arms of at least one of the interferometers such that photon pulses which take the short arm of one of the first interferometer and the long arm of the second interferometer take the same time to pass through both interferometers as photon pulses which pass through the long arm of the first interferometer and the short arm of the second interferometer.

18. The system of claim 11, wherein the phase encoding means comprises a first interferometer comprising a long arm and a short arm; and a second interferometer comprising a long arm and a short arm, the first and second interferometers being configured such that a photon passing through the first interferometer experiences a different change in its phase to a photon travelling through the second interferometer, the phase encoding means further comprising first switching means to direct a photon into either the first interferometer or the second interferometer.

19. The system of claim 18, further comprising a third interferometer comprising a long arm and a short arm and a fourth interferometer comprising a long arm and a short arm, the third and fourth interferometers being configured such that a photon passing through the third interferometer experiences a different change in its phase to a photon travelling through the fourth interferometer, the system further comprising means to direct a photon into either the third interferometer or the fourth interferometer.

20. The system of claim 19, the detector being further configured to ignore signals from photon pulses which pass through the long arms of either the first and second interferometers and the long arms of either of the third and fourth interferometers and to ignore signals from photon pulses which have passed through the short arms of either of the first and second interferometers and the short arms of either of the third and fourth interferometers.

21. The system of claim 19, further comprising means to vary the path length of one of the arms of at least one of the interferometers such that photon pulses which take the short arm of first or second interferometers and the long arm of the third or fourth interferometers take the same time to pass through both interferometers as photon pulses which pass through the long arm of the first or second interferometers and the short arm of the third or fourth interferometers.

22. The system of claim 11, wherein the phase encoding means comprises a first station comprising first interferometer having a long arm and a short arm, one of said arms comprising phase variation means configured to set the phase of a photon passing through that arm to one of at least two values, a second station comprising means to apply a phase variation configured to set a photon pulse passing therethrough to have its phase to one of at least two values, and reflecting means to reflect the pulse back through the first interferometer.

23. The system of claim 22, wherein the detector is configured to ignore photon pulses which have passed through either the long arm of the first interferometer twice or the short arm of the first interferometer twice.

24. The system of claim 23, further comprising directing means configured to ensure that photons which have passed through the short arm of the first interferometer are reflected back through the long arm of the first interferometer and photons which have passed through the long arm of the first interferometer are reflected back through the short arm of the first interferometer.

25. The system of claim 24, wherein the directing means comprises first polarising means configured such that photons which have travelled through different arms of the first interferometer have different polarisations, and second polarising means which distinguish between the photons having different polarisations and direct them down the appropriate arm of the first interferometer.

26. The system of claim 9, wherein the photons are encoded using polarisation.

27. The system of claim 1, wherein there are from 2 to 1000 photon pulses in each group period.

28. The system of claim 1, wherein there is a separation from 100 ns to 10 µs between the final pulse in any group and the first pulse in the following group.

29. The system of claim 1, wherein separation between photon pulses is from 0.5 to 5 ns.

30. The system of claim 1, wherein the probability of a photon being present in a photon pulse is less than 0.2.

31. The system of claim 1, wherein said emitter comprises a photon source, means to subdivide the output of said source into a plurality of optical fibres having differing lengths and combiner means to combine said plurality of fibres such that a plurality of pulses spaced apart in time are outputted from said combiner means.

32. A method of quantum communication comprising:

emitting a plurality of photon pulses in groups of photon pulses from an emitter, each group of photon pulses emitted over a group time period, wherein the average number of photons per pulse is less than 1;

detecting the emitted photon pulses, wherein the separation between pulses in said group of pulses is less than the time when a detector may register an after pulse signal or a false positive reading, and the detector is in an on state for at least the duration of two photon pulses during said group time period during detection; and ignoring a second or subsequent pulse in a group of pulses received by the detector in a group time period after a first pulse has been detected for the group of pulses.

33. A method of operating a detector in quantum communication system, wherein a plurality of photon pulses are sent to the detector in groups of photon pulses from an emitter, each group of photon pulses emitted over a group time period, wherein the average number of photons per pulse is less than 1, the method comprising:

detecting the emitted photon pulses, wherein the separation between pulses in said group of pulses is less than the time when a detector may register an after pulse signal or a false positive reading, and the detector is in an on state for at least the duration of two photon pulses during said group time period during detection; and ignoring a second or subsequent pulses in a group of pulses received by the detector in a group time period after a first pulse has been detected for the group of pulses.

* * * * *